(12) United States Patent
Abe

(10) Patent No.: US 12,130,582 B2
(45) Date of Patent: Oct. 29, 2024

(54) DRUM UNIT, CARTRIDGE, PROCESS CARTRIDGE AND ELECTROPHOTOGRAPHIC IMAGE FORMING APPARATUS HAVING A MOVABLE COUPLING MEMBER

(71) Applicant: CANON KABUSHIKI KAISHA, Tokyo (JP)

(72) Inventor: Daisuke Abe, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/232,939

(22) Filed: Aug. 11, 2023

(65) Prior Publication Data

US 2023/0384732 A1 Nov. 30, 2023

Related U.S. Application Data

(60) Division of application No. 18/089,751, filed on Dec. 28, 2022, now Pat. No. 11,774,906, which is a division of application No. 17/712,261, filed on Apr. 4, 2022, now Pat. No. 11,573,525, which is a division of application No. 17/152,879, filed on Jan. 20, 2021, now Pat. No. 11,327,435, which is a division of application No. 16/568,928, filed on Sep. 12, 2019, now Pat. No. 10,921,749, which is a continuation of application No. PCT/JP2018/011561, filed on Mar. 15, 2018.

(30) Foreign Application Priority Data

Mar. 15, 2017 (JP) ................................. 2017-050285

(51) Int. Cl.
*G03G 21/00* (2006.01)
*G03G 21/18* (2006.01)

(52) U.S. Cl.
CPC ....... *G03G 21/186* (2013.01); *G03G 21/1857* (2013.01); *G03G 2221/1657* (2013.01)

(58) Field of Classification Search
CPC ............. G03G 21/186; G03G 21/1857; G03G 21/1647; G03G 2221/1657
See application file for complete search history.

(56) References Cited

U.S. PATENT DOCUMENTS 6,334,035 B1 12/2001 Abe et al.
6,377,759 B1 4/2002 Abe et al.
(Continued)

FOREIGN PATENT DOCUMENTS

CN 106406060 A 2/2017
CN 106444321 A 2/2017
(Continued)

OTHER PUBLICATIONS

International Search Report and Written Opinion for International Patent Application No. PCT/JP2018/011561, dated Jun. 5, 2018.
(Continued)

*Primary Examiner* — Robert B Beatty
(74) *Attorney, Agent, or Firm* — Venable LLP

(57) ABSTRACT

To provide a process cartridge, a drum unit capable of receiving a driving force from the main assembly, and an image forming apparatus including the process cartridge. A cartridge is provided with a movable member having a driving force receiving portion. The movable member moves between an advanced position and a retracted position.

14 Claims, 21 Drawing Sheets

(56) References Cited

U.S. PATENT DOCUMENTS

| | | |
|---|---|---|
| 6,463,225 B1 | 10/2002 | Abe et al. |
| 6,473,585 B2 | 10/2002 | Abe et al. |
| 6,505,008 B2 | 1/2003 | Abe |
| 6,535,699 B1 | 3/2003 | Abe et al. |
| 6,823,155 B2 | 11/2004 | Tsuda et al. |
| 6,934,485 B2 | 8/2005 | Miyabe et al. |
| 6,993,264 B2 | 1/2006 | Oguma et al. |
| 7,162,176 B2 | 1/2007 | Oguma et al. |
| 7,203,442 B2 | 4/2007 | Matsubara et al. |
| 7,242,885 B2 | 7/2007 | Abe et al. |
| 7,315,706 B2 | 1/2008 | Oguma et al. |
| 8,135,304 B2 | 3/2012 | Abe |
| 8,139,972 B2 | 3/2012 | Abe et al. |
| 8,472,840 B2 | 6/2013 | Abe et al. |
| 10,241,459 B1 | 3/2019 | Hu et al. |
| 10,921,749 B2 | 2/2021 | Abe |
| 11,327,435 B2 | 5/2022 | Abe |
| 2001/0043814 A1 | 11/2001 | Abe |
| 2008/0152388 A1 | 6/2008 | Ueno et al. |
| 2012/0275824 A1 | 11/2012 | Gu et al. |
| 2013/0336674 A1 | 12/2013 | Abe et al. |
| 2015/0093146 A1 | 4/2015 | Sato et al. |
| 2016/0370750 A1 | 12/2016 | Ikeda et al. |
| 2016/0370751 A1 | 12/2016 | Gu et al. |
| 2017/0146951 A1 | 5/2017 | Yan et al. |
| 2017/0146952 A1 | 5/2017 | Ikeda et al. |
| 2018/0017933 A1 | 1/2018 | Zhou |
| 2018/0203403 A1 | 7/2018 | Ikeda et al. |
| 2018/0329339 A1 | 11/2018 | Nieda |
| 2019/0187608 A1 | 6/2019 | Uesugi et al. |
| 2019/0286050 A1 | 9/2019 | So et al. |
| 2020/0174423 A1 | 6/2020 | Ogawa et al. |
| 2021/0206183 A1 | 7/2021 | Deng |

FOREIGN PATENT DOCUMENTS

| | | |
|---|---|---|
| DE | 20 2016 103 441 U1 | 7/2016 |
| JP | 2008-233867 A | 10/2008 |
| JP | 2013-518303 A | 5/2013 |
| JP | 2014-016610 A | 1/2014 |
| JP | 2016-028261 A | 2/2016 |
| WO | 2016/204246 A1 | 12/2016 |

OTHER PUBLICATIONS

Dec. 14, 2021 Office Action in Japanese Patent Application No. 2018-047025 (with computer translation).

Apr. 26, 2021 Extended Search Report in European Patent Application No. 18 76 7736.4.

Jun. 28, 2021 Office Action in Chinese Patent Application No. 201880017788.3.

Feb. 14, 2022 Office Action in Chinese Patent Application No. 201880017788.3.

(a)

(b)

(a)

(b)

(a)

(b)

(a)

(b)

(a)

(b)

(a)

(b)

DRUM UNIT, CARTRIDGE, PROCESS CARTRIDGE AND ELECTROPHOTOGRAPHIC IMAGE FORMING APPARATUS HAVING A MOVABLE COUPLING MEMBER

TECHNICAL FIELD

The present invention relates to an electrophotographic image forming apparatus, a cartridge, a process cartridge, and a drum unit, for electrophotographic image formation.

BACKGROUND OF THE INVENTION

In an electrophotographic image forming apparatus, the structure is known in which elements such as a photosensitive drum and a developing roller as a rotatable member related to image formation are integrated as a cartridge, which can be dismountably mounted to a image forming apparatus main assembly (hereinafter, apparatus main assembly). Here, in order to rotate the photosensitive drum in the cartridge, it is preferable to transmit the driving force from the apparatus main assembly. In this connection, the structure is known in which the coupling member on the cartridge side is engaged with the drive fore transmission portion such as the drive pin on the apparatus main assembly side to transmit the drive force.

Here, in some image forming apparatus, the structure of is known in which the cartridge can be removed in a predetermined direction substantially perpendicular to the rotation axis of the photosensitive drum. In Japanese Laid-open Patent Application No. 2008-233867 discloses a structure in which a coupling member provided at the end of the photosensitive drum is advanced and retracted in the rotation axis direction of the photosensitive drum. By this, a coupling member provided on the cartridge engages with and disengages from the drive pin provided in the apparatus main assembly. As a result, the rotational driving force of the apparatus main assembly is transmitted to the cartridge. The structure as described above is known.

SUMMARY OF THE INVENTION

Problem to be Solved by the Invention

An object of the present invention is to develop the above-mentioned prior art.

Means for Solving the Problem

A representative structure disclosed in the present application is a process cartridge comprising:
(1) a photosensitive drum;
(2) a frame rotatably supporting said photosensitive drum;
(3) a flange provided at an end portion of said photosensitive drum to transmit a driving force to said photosensitive drum; and
(4) a coupling member provided on said flange including (4-1) a movable member provided with a driving force receiving portion configured to receive the driving force, said movable member being movable relative to said flange between (a) an advanced position advanced away from said photosensitive member and (b) a retracted position retracted toward said photosensitive drum, and (4-2) a connecting member connected with said flange so as to transmit the driving force from said movable member to said flange;

wherein said connecting member includes,
(4-2-1) a shaft portion extending along a moving direction of said movable member, and
(4-2-2) a restricting portion configured to restrict said movable member so as to suppress disengagement, from said flange, of said movable member placed in the position, wherein said restricting portion receives the driving force from said movable member by engagement with said movable member.

Another representative structure disclosed in the present application is a process cartridge comprising:
(1) a photosensitive drum;
(2) a frame rotatably supporting said photosensitive drum;
(3) a flange provided at an end portion of said photosensitive drum; and
(4) a coupling member provided on said flange to receive a driving force for rotating said photosensitive drum, said coupling member including (4-1) a movable member provided with a driving force receiving portion configured to receive the driving force, said movable member being movable relative to said flange between (a) an advanced position advanced away from said photosensitive member and (b) a retracted position retracted toward said photosensitive drum, and (4-2) a connecting member connected with said flange so as to transmit the driving force from said movable member to said flange;

wherein said connecting member includes,
(4-2-1) a shaft portion extending along a moving direction of said movable member, and
(4-2-2) an enlarged portion provided at the free end side of said shaft portion, said enlarged portion having a maximum rotation radius larger than a maximum rotation radius of said shaft portion, said enlarged portion being capable of receiving the driving force from said movable member by engagement with said movable member.

In addition, further representative structure disclosed in the present application is a cartridge comprising:
(1) a rotatable member rotatable while carrying toner on a surface thereof;
(2) a frame configured to rotatably support said rotatable member;
(3) a transmission member configured to transmit a driving force to said rotatable member; and
(4) a coupling member provided on said transmission member, said coupling member including (4-1) a movable member provided with a driving force receiving portion configured to receive the driving force, said movable member being movable relative to said transmission member between (a) an advanced position advanced toward outside of said cartridge and (b) a retracted position retracted toward an inside of said cartridge, and (4-2) a connecting member connected with said transmission member so as to transmit the driving force from said movable member to said transmission member;

wherein said connecting member includes,
(4-2-1) a shaft portion extending along a moving direction of said movable member, and
(4-2-2) an enlarged portion provided at the free end side of said shaft portion, said enlarged portion having a maximum rotation radius larger than a maximum rotation radius of said shaft portion, said enlarged portion being capable of receiving the driving force from said movable member by engagement with said movable member.

In addition, further representative arrangement disclosed in the present application is a cartridge comprising:
(1) a rotatable member rotatable while carrying toner on a surface thereof;
(2) a frame rotatably supporting said rotatable member;
(3) a transmission member configured to transmit a driving force to said rotatable member; and
(4) a coupling member provided on said transmission member, said coupling member including (4-1) a movable member provided with a driving force receiving portion configured to receive the driving force, said movable member being movable relative to said transmission member between (a) an advanced position advanced toward outside of said cartridge and (b) a retracted position retracted toward an inside of said cartridge, and (4-2) a connecting member connected with said transmission member so as to transmit the driving force from said movable member to said transmission member;
wherein said connecting member includes,
(4-2-1) a shaft portion extending along a moving direction of said movable member, and
(4-2-2) an enlarged portion provided at the free end side of said shaft portion, said enlarged portion having a maximum rotation radius larger than a maximum rotation radius of said shaft portion, said enlarged portion being capable of receiving the driving force from said movable member by engagement with said movable member.

In addition, further representative arrangement disclosed in the present application is a drum unit comprising:
(1) a photosensitive drum;
(2) the flange provided at an end portion of said photosensitive drum to transmit a driving force to said photosensitive drum; and
(3) a coupling member provided on said flange including (3-1) a movable member provided with a driving force receiving portion configured to receive the driving force, said movable member being movable relative to said flange between (a) an advanced position advanced away from said photosensitive member and (b) a retracted position retracted toward an inside of said photosensitive drum, and (3-2) a connecting member connected with said flange so as to transmit the driving force from said movable member to said flange;
wherein said connecting member includes,
(3-2-1) a shaft portion extending along a moving direction of said movable member, and
(3-2-2) a restricting portion configured to restrict said movable member so as to suppress disengagement, from said flange, of said movable member placed in the position,
wherein said restricting portion receives said driving force from said movable member by engagement with said movable member.

In addition, the representative structure disclosed in the present application is a drum unit comprising:
(1) a photosensitive drum;
(2) the flange provided at an end portion of said photosensitive drum to transmit a driving force to said photosensitive drum; and
(3) a coupling member provided on said flange including (3-1) a movable member provided with a driving force receiving portion configured to receive the driving force, said movable member being movable relative to said flange between (a) an advanced position advanced away from said photosensitive member and (b) a retracted position retracted toward an inside of said photosensitive drum, and (3-2) a connecting member connected with said flange so as to transmit the driving force from said movable member to said flange,
wherein said connecting member includes,
(3-2-1) a shaft portion extending along a moving direction of said movable member, and
(3-2-2) a enlarged portion provided at the free end side of said shaft portion, said enlarged portion having a maximum rotation radius larger than a maximum rotation radius of said shaft portion, said enlarged portion being capable of receiving the driving force from said movable member by engagement with said movable member,
wherein said enlarged portion receives the driving force from said movable member by engagement with said movable member.

In addition, another representative arrangement disclosed in the present application is a drum unit detachably mountable to a main assembly of an electrophotographic image forming apparatus, said drum unit comprising:
a photosensitive drum;
a flange provided at an end portion of said photosensitive drum to transmit a driving force to said photosensitive drum;
a movable member having a free end portion provided with a driving force receiving portion configured to receive the driving force from the main assembly, and a small diameter portion at a position closer to said flange than the free end portion, the small diameter portion having a maximum rotation radius smaller than a maximum rotation radius of the free end portion, the movable member being movable relative to said flange between a transmitting position in which the driving force is capable of being transmitted to said flange and a non-transmitting position in which the driving force is not transmitted to said flange, and
a regulated portion which is restricted to restrict movement of said movable member in a direction away from said flange is provided and at least a part of said free end portion and said small diameter portion of said movable member.

In addition, further representative arrangement disclosed in the present application is a drum unit detachably mountable to a main assembly of an electrophotographic image forming apparatus, said drum unit comprising:
a photosensitive drum;
a shaft provided at an end of said photosensitive drum and configured to transmit a driving force to said photosensitive drum;
a movable member configured to receive a driving force and transmit the driving force to said shaft, said movable member being movable relative to said shaft between a transmitting position in which the driving force is capable of being transmitted to said shaft and a non-transmitting position in which the driving force is not transmitted to said shaft;
a first urging member to urge said movable member in a direction from the non-transmitting position toward the transmitting position; and
a second urging member configured to urge said movable member in a direction from the transmitting position toward the non-transmitting position.

Effect of the Invention

The prior art described above can be developed.

EMBODIMENTS OF THE INVENTION

Figure 1:
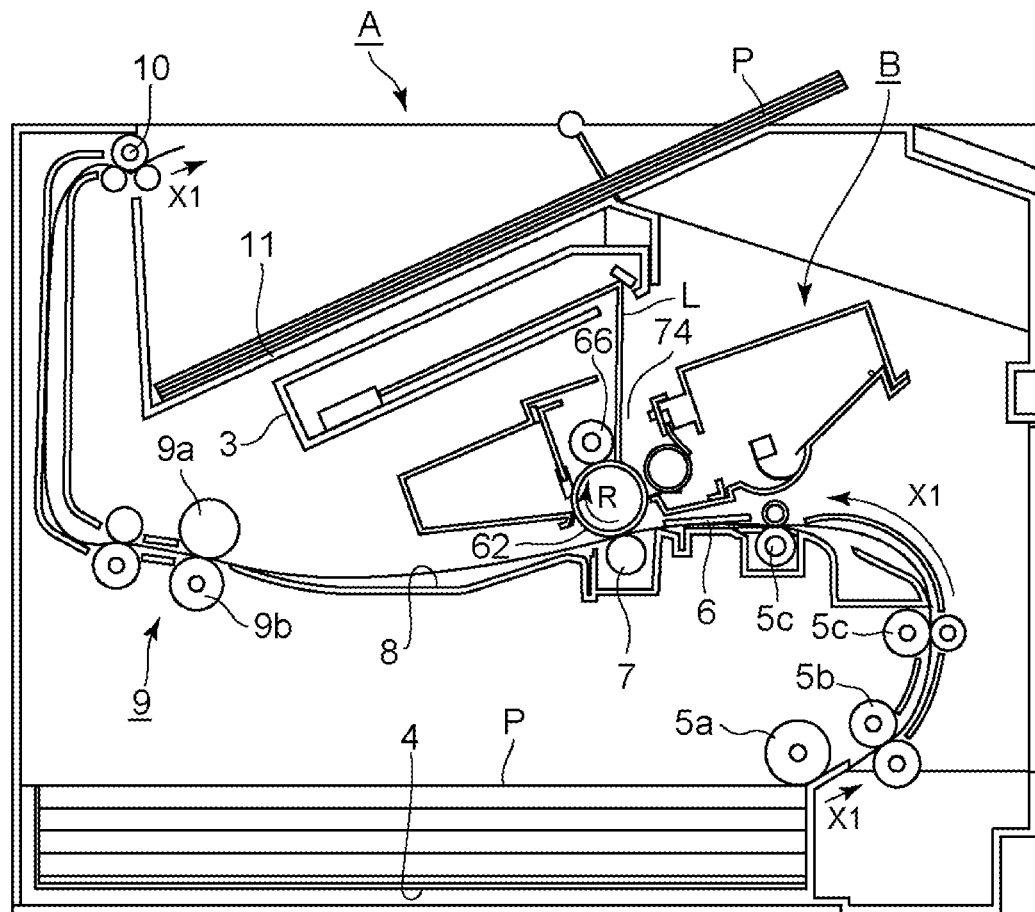
FIG. 1 is a cross-sectional view of an image forming apparatus.

In the following, the embodiments of the present invention will be described in conjunction with the accompanying drawings.

Here, an image forming apparatus (image forming apparatus for forming an electrophotographic image) employing an electrophotographic method is called an electrophotographic image forming apparatus. Here, the electrophotographic method refers to a method of developing an electrostatic image formed on a photosensitive member with toner. Here, the electrophotographic method refers to a method of developing, with toner, an electrostatic image formed on a photosensitive member. Here, the developing method may be any of a one-component developing method, a two-component developing method, and a dry development method. In addition, the electrophotographic photosensitive drum (electrophotographic photosensitive drum) is usable with an electrophotographic image forming apparatus, and it means a structure in which a photosensitive member (photosensitive layer) is provided on the surface of a drum-shaped cylinder.

Here, a charging roller, a developing roller, and so on involved in image formation and acting on the photosensitive drum are called process means. In addition, a cartridge including a photosensitive member or process means (cleaning blade, developing roller, and so on) involved in image formation is called a process cartridge. In this embodiment, a process cartridge with which the photosensitive drum, the charging roller, the developing roller, the cleaning blade are integrated will be described as an example.

In the embodiment, among the electrophotographic methods usable with a wide range of applications such as multifunction machines, fax machines, and printers, take a laser beam printer will be taken as a example. Here, the reference numerals in the embodiments are for referring to the drawings and do not limit the structure. In addition, the dimensions and the like in Embodiments are for the purpose of clearly describing the relationship, and do not limit the structure.

A longitudinal direction of the process cartridge in the embodiments is a direction substantially perpendicular to the direction in which the process cartridge is mounted to and dismounted from the electrophotographic image forming apparatus main assembly. In addition, the longitudinal direction of the process cartridge is parallel to the rotation axis of the electrophotographic photosensitive drum (in the direction crossing with the sheet feeding direction). In the longitudinal direction, the side of the process cartridge where the photosensitive drum receives rotational force from the image forming apparatus main assembly is called a driving side (driven side), and the opposite side is called non-driving side. In addition, in the case where the description is made as upper (upper) without specifying otherwise, it means an upper side in the direction of gravity, and the opposite side means a lower side in the direction of gravity (the lower side) at the time when the image forming device is loaded in the image forming apparatus.

Embodiment 1

In the following, the laser beam printer in this embodiment will be described with reference to the accompanying drawings. The cartridge in this embodiment is a process cartridge in which a photosensitive drum as a photosensitive member (image bearing member, rotary member), a developing roller, a charging roller, and a cleaning blade as process means are integrated. This cartridge is mountable to and dismountable from the main assembly. Here, in the cartridge, as a rotatable member rotary member which rotates by receiving rotational force from the apparatus main assembly, a gear, a photosensitive drum, a flange, a developing roller, and so on are provided.

Figure 2:
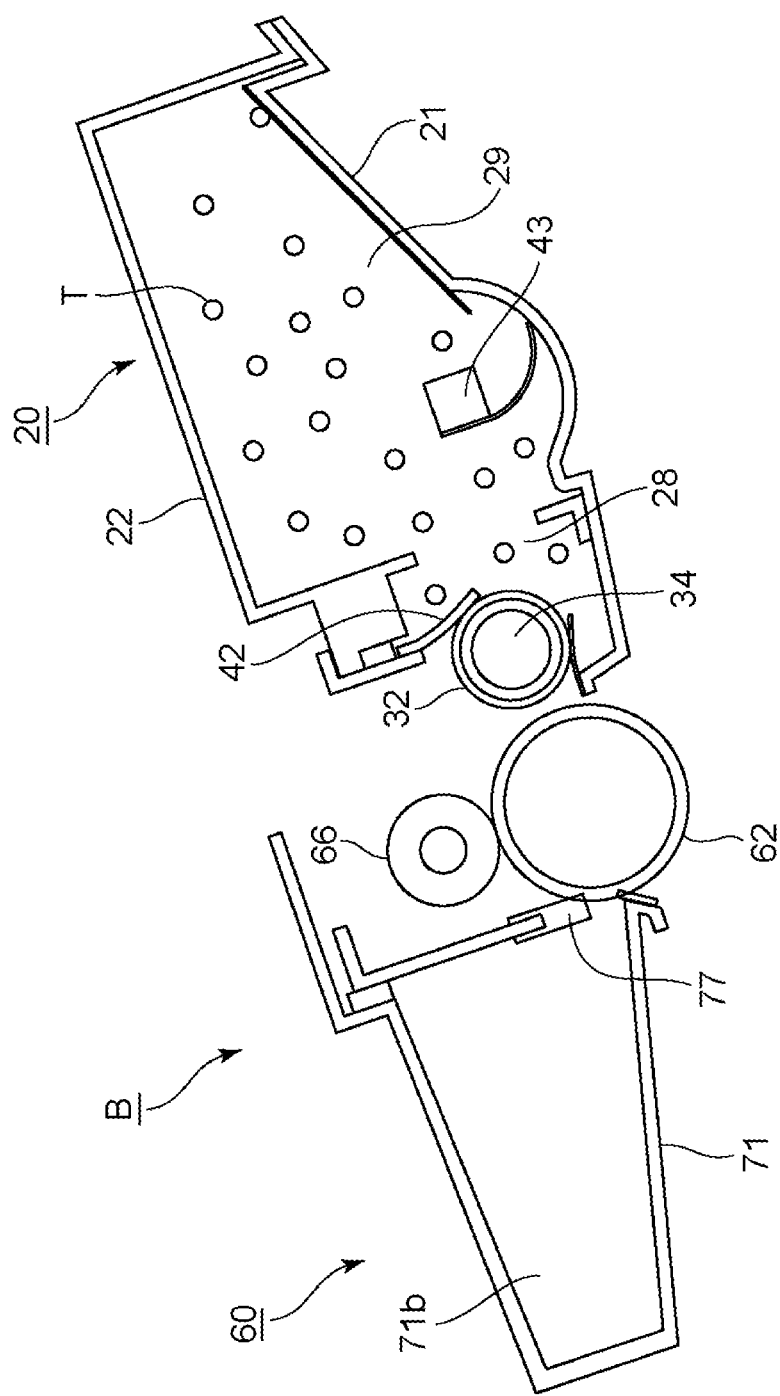
FIG. 2 is a cross-sectional view of a cartridge.
Figure 3:
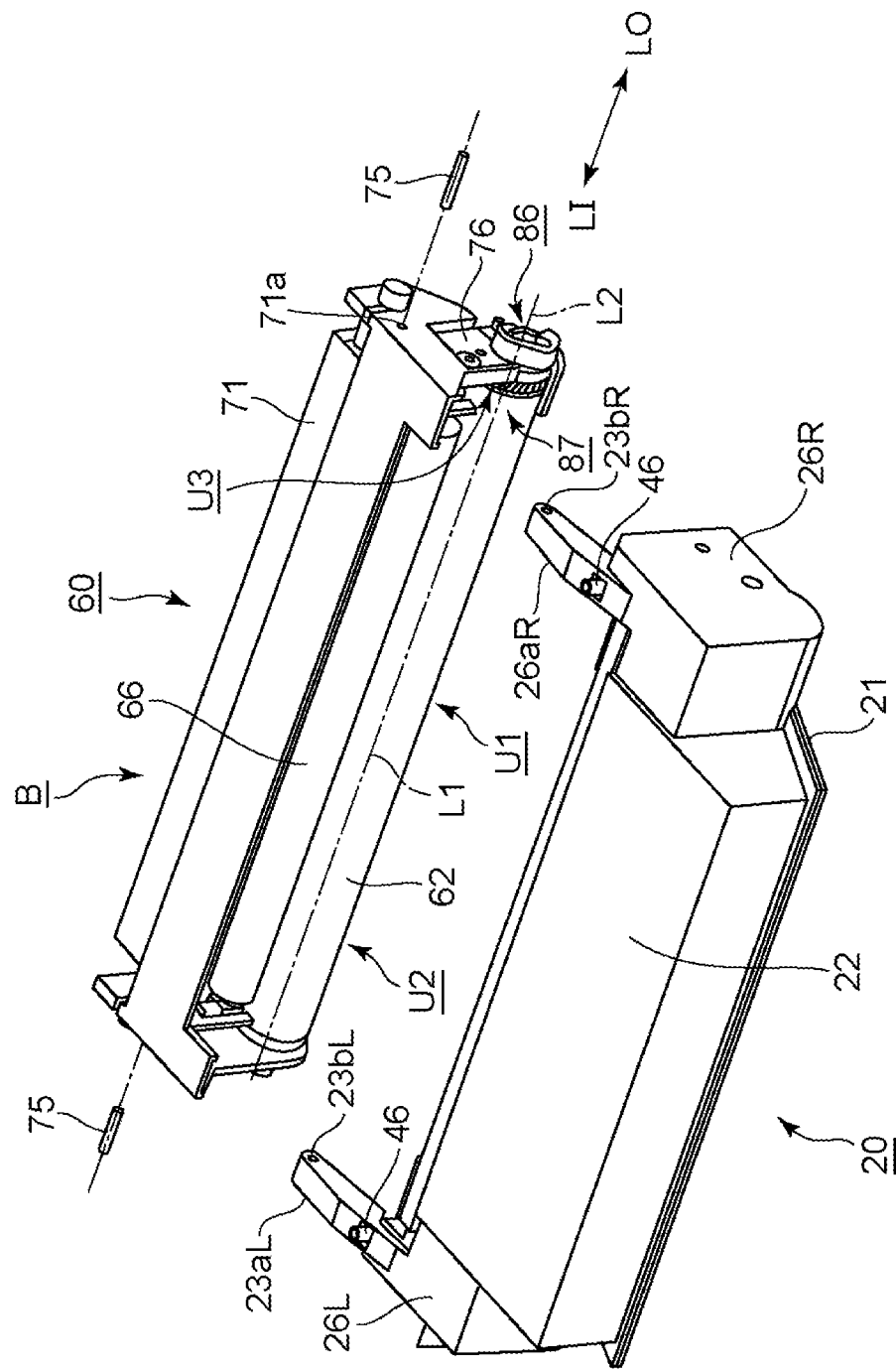
FIG. 3 is a perspective view when the cartridge is disassembled.

In the following, referring to FIG. 1, the structure of laser beam printer as electrophotographic image forming apparatus, and image forming process will be explained. Referring to FIG. 2 and FIG. 3, a detailed structure of process cartridge will be explained.

(Laser Beam Printer and Image Forming Process)

FIG. 1 is a cross-sectional view of a laser beam printer main assembly A (hereinafter, referred to as an apparatus main assembly A) and a process cartridge (hereinafter, referred to as a cartridge B) which constitute the electrophotographic image forming apparatuses. In addition, FIG. 2 is a cross-sectional view of the cartridge B.

Hereinafter, the apparatus main assembly A means a portion of the laser beam printer which is an electrophotographic image forming apparatus, excluding the removable cartridge B.

First, referring to FIG. 1, the structure of the laser beam printer which is the electrophotographic image forming apparatus will be described.

The electrophotographic image forming apparatus shown in FIG. 1 is a laser beam printer using electrophotographic technology in which the cartridge B is capable of being mounted to and dismounted from the apparatus main assembly A (mountable and dismountable). When the cartridge B is mounted in the apparatus main assembly A, the cartridge B is disposed below a laser scanner unit 3 as an exposure means (exposure device).

In addition, below the cartridge B, there is disposed a sheet tray 4 containing sheets P as recording materials (sheet materials) which are objects on which the image forming apparatus forms images.

Furthermore, in the apparatus main assembly A, a pickup roller 5a, a feeding roller pair 5b, a feeding roller pair 5c, a transfer guide 6, a transfer roller 7, a feed guide 8, a fixing device 9, a discharge roller pair 10, and a discharge tray 11 are provided along the conveyance direction X1 of the sheet P, in the order from the upstream side. Here, the fixing device 9 as a fixing means includes a heating roller 9a and a pressure roller 9b.

Referring to FIG. 1 and FIG. 2, ac outline of the image formation process will be described.

In response to a print start signal, a drum cylinder 62 as a photosensitive drum which can carry a developer is rotationally driven at a predetermined circumferential speed (process speed) in a direction of an arrow R (hereinafter referred to as a rotational direction R).

The charging roller 66 to which a bias voltage is applied contacts an outer peripheral surface of the drum cylinder 62, and uniformly charges the outer peripheral surface of the drum cylinder 62.

The laser scanner unit 3 as an exposure means outputs a laser beam L in accordance with an image information inputted to the laser printer. The laser beam L passes through an exposure window 74 on the upper surface of the cartridge B and scans and exposes the outer peripheral surface of the drum cylinder 62. By this, a portion of the charged drum cylinder 62 is electrically discharged to form an electrostatic image (electrostatic latent image) on the surface of the drum cylinder.

On the other hand, as shown in FIG. 2, in the developing unit 20 as the developing device, the developer in a toner chamber 29 (hereinafter referred to as "toner T") is stirred and transported by rotation of the feeding sheet 43 as a feed member, and it is delivered into the toner supply chamber 28.

The toner T as the developer is carried on the surface of the developing roller 32 as the developing means (process means, rotatable member), by the magnetic force of the magnet roller 34 (stationary magnet). Here, the developing roller 32 functions as a toner carrier (developer carrier, developing member) for carrying and transporting the developer to the developing zone to develop the electrostatic image formed on the drum cylinder 62. A layer thickness of the toner T fed to the developing region on the circumferential surface of the developing roller 32 is regulated by the developing blade 42. Here, the toner T is triboelectrically charged between the developing roller 32 and the developing blade 42.

As described above, the toner T carried on the developing roller 32 develops (visualizes) the electrostatic image formed on the drum cylinder 62. And, the drum cylinder 62 is a rotatable member which carries the toner image (image by toner) developed by the developing roller 32 on its surface and rotates in the rotational direction R. In addition, the drum cylinder 62 is an image bearing member which carries a toner image.

In addition, as shown in FIG. 1, in timed relationship with an output timing of the laser beam L, the sheet P stored in the lower portion of the apparatus main assembly A is fed from the sheet tray 4 by the pickup roller 5a, the feeding roller pair 5b, and the feeding roller pair 5c.

And, the sheet P is supplied to the transfer position (transfer nip) between the drum cylinder 62 and the transfer roller 7 by way of the transfer guide 6. At this transfer position, the toner image is sequentially transferred from the drum cylinder 62 as image bearing member to the sheet P as the recording material.

The sheet P on which the toner image has been transferred is separated from the drum cylinder 62 and fed to the fixing device 9 along the feed guide 8. And, the sheet P passes through a fixing nip portion between the heating roller 9a and the pressure roller 9b which constitute the fixing device 9. In the fixing nip portion, the unfixed toner image on the sheet P is fixed to the sheet P by being pressed and heated. Thereafter, the sheet P on which the toner image is fixed is fed by the discharge roller pair 10 and discharged to the discharge tray 11.

On the other hand, as shown in FIG. 2, after the toner T is transferred onto the sheet, untransferred residual toner remaining on the drum surface without being transferred onto the sheet is deposited on the surface of the drum cylinder 62. The untransferred residual toner is removed by the cleaning blade 77 which is in contact with the circumferential surface of the drum cylinder 62. By this, the toner remaining on the drum cylinder 62 is removed, so that the cleaned drum cylinder 62 may be again charged and used for the imaging process. The toner (untransferred residual toner) removed from the drum cylinder 62 is stored in a waste toner chamber 71b of the cleaning unit 60.

Here, the charging roller 66, the developing roller 32, and the cleaning blade 77 all function as the process means which act on the drum cylinder 62. The image forming apparatus of this embodiment employs the method of removing the untransferred residual toner by the cleaning blade 77, but a system (cleanerless system) may be employed in which the untransferred residual toner which is adjusted in the electric charge is collected by the developing device simultaneously with development. Here, in the cleanerless system, an auxiliary charging member (such as an auxiliary charging brush) for adjusting the charge of the untransferred residual toner also functions as the process means.

(Structure of the Process Cartridge)

Next, referring to FIG. 2 and FIG. 3, detailed structure of the cartridge B will be described.

FIG. 3 is an exploded perspective view of the cartridge B. The cartridge B includes a frame (casing) that rotatably supports the drum cylinder 62 and the developing roller 32. The frame of cartridge B can be disassembled into multiple units. The cartridge B of this embodiment is an integrated unit of the cleaning unit 60 and the developing unit 20, and the cartridge B includes a frame of the cleaning unit 60 and a frame of the developing unit 20.

In this embodiment, the description will be main using a structure in which the cleaning unit 60 supporting the drum cylinder 62 and the developing unit 20 supporting the developing roller 32 are connected by two connecting pins 75, but the cartridge B may be divided into three or more units. A plurality of units may not be coupled by a coupling member such as a pin, and only a portion of the units may be replaced.

The cleaning unit 60 includes a cleaning frame 71, a drum unit U1, the charging roller 66, the cleaning blade 77 and the like.

The drum unit U1 includes a drum cylinder unit U2 and a coupling unit U3 provided at the driving side end of the drum cylinder unit U2. In the drum cylinder unit U2, the drum cylinder 62 and the non-driving side flange are coupled together. The coupling unit U3 is for receiving a rotational force for rotating the drum unit U1 from the outside of the drum unit U1. The coupling unit U3 includes a driving side flange 87 as a flange member and a moving coupling member (moving member, advancing retracting member, engaging member) 86. The driving side flange 87 is mounted to the driving side of the drum cylinder 62. The coupling unit U3 is mounted to the drum cylinder 62.

The moving member 86 receives rotational driving force from the apparatus main assembly A. The moving member 86 drives the driving side flange 87. The driving side flange 87 drives the drum cylinder 62.

As shown in FIG. 3, the drum cylinder 62 is rotatable about a rotation axis L1 (hereinafter, referred to as an axis L1). In addition, the moving member 86 is rotatable about a rotation axis L2 (hereinafter referred to as an axis L2). Here, in this embodiment, a moving member 86 is connected to the end of the drum cylinder 62, and the axis L1 of the drum cylinder 62 and the axis L2 of the moving member 86 are substantially coaxial. Therefore, in the following description, the axis L1 and the axis L2 may be referred to as one and the same.

In addition, in the direction of the axis L2, the direction toward the driving side is referred to as a longitudinally outer side LO, and a direction toward the non-driving side as a longitudinally inner side LI.

Here, the moving member 86 is constituted so as to be able to advance and retract along the axis L2 relative to the drum cylinder 62 and the driving side flange 87. In other words, the moving member 86 is movable substantially parallel at least to the direction (axial direction) in which the axis (L2) extends. The moving member 86 can take a position (projected position, advanced position, first position) advanced (projected) toward the outside of driving side flange 87 and a position retracted toward the inside (drum cylinder side) of driving side flange 87 retracted position, second position). That is, the moving member 86 can reciprocate along the axial direction between the projected position and the retracted position (parallel to the rotation axis L1 of the drum cylinder 62). That is, the moving member 86 can reciprocate along the axial direction between the projected position and the retracted position (parallel to the rotation axis L1 of the drum cylinder 62). Details will be described hereinafter.

On the other hand, as shown in FIGS. 2 and 3, the developing unit 20 includes a toner accommodating container 22, a bottom member 21, a first side member 26L (non-driving side), a second side member 26R (driving side), the developing blade 42, the developing roller 32, and the magnet roller 34. Here, in the toner container 22, a feeding sheet 43 (stirring sheet) as a feeding member for feeding the toner is provided, and a toner T as a developer is contained therein. In addition, the developing unit 20 is provided with a compression spring 46 which applies an urging force in order to regulate the attitude of the unit between the developing unit 20 and the cleaning unit 60. Furthermore, the cleaning unit 60 and the developing unit 20 are rotatably connected to each other by a connecting pin 75 as a connecting member, so that the cartridge B is constituted.

More specifically, rotation holes 23bL, 23bR are provided at ends of arm portions 23aL and 23aR provided on opposite ends of the developing unit 20, respectively in the longitudinal direction (axial direction of the developing roller 32). The rotation holes 23bL and 23bR are parallel to the axis of the developing roller 32.

In addition, in each of the opposite longitudinal opposite end portions of the cleaning frame 71 which is a frame on the cleaning unit 60 side, insertion holes 71a for inserting the connection pins 75 are formed. And, while aligning the arm portions 23aL and 23aR with the predetermined position of the cleaning frame 71, the connecting pin 75 is inserted into the rotation holes 23bL and 23bR and the insertion hole 71a. By this, the cleaning unit 60 and the developing unit 20 are rotatably coupled to each other about the connecting pin 75 as the connecting member.

At this time, a compression spring 46 mounted to the root of the arm portions 23aL and 23aR abuts to the cleaning frame 71 and urges the developing unit 20 to the cleaning unit 60 about the connecting pin 75 as the center of rotation.

By this, the developing roller 32 as a process means is reliably pressed in the direction of the drum cylinder 62 as the rotatable member. And, by ring-shaped spacers (not shown) mounted at the opposite ends of the developing roller 32 the developing roller 32 maintains a predetermined gap with respect to the drum cylinder 62.

(Mounting and Dismounting of Process Cartridge)

Figure 4:
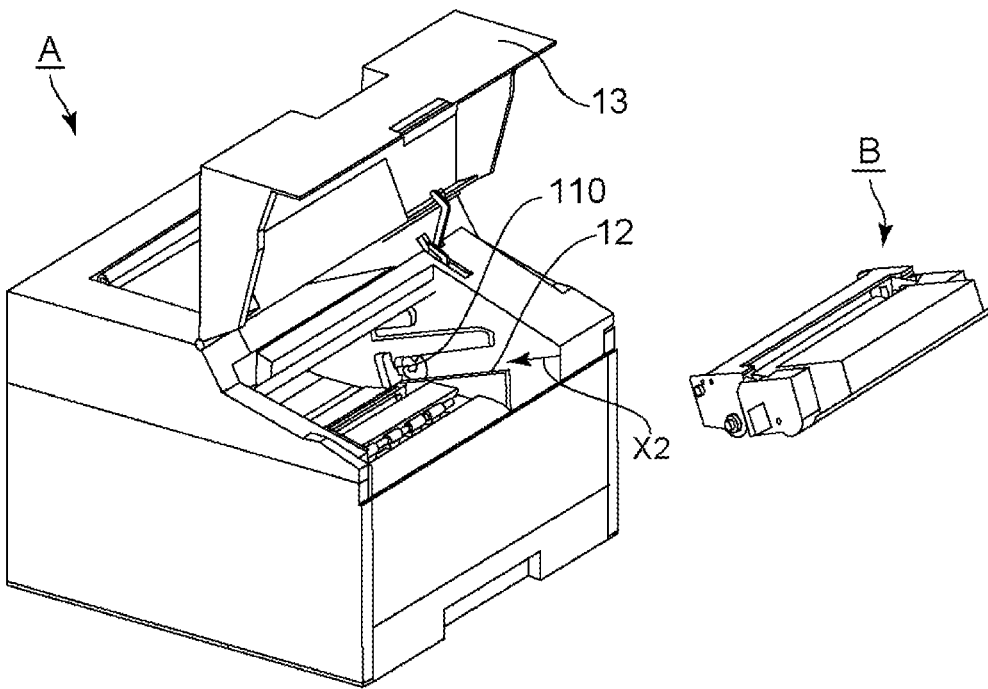
In FIG. 4, part (a) and part (b) are illustrations for explaining how the cartridge is mounted and dismounted.
Figure 4:
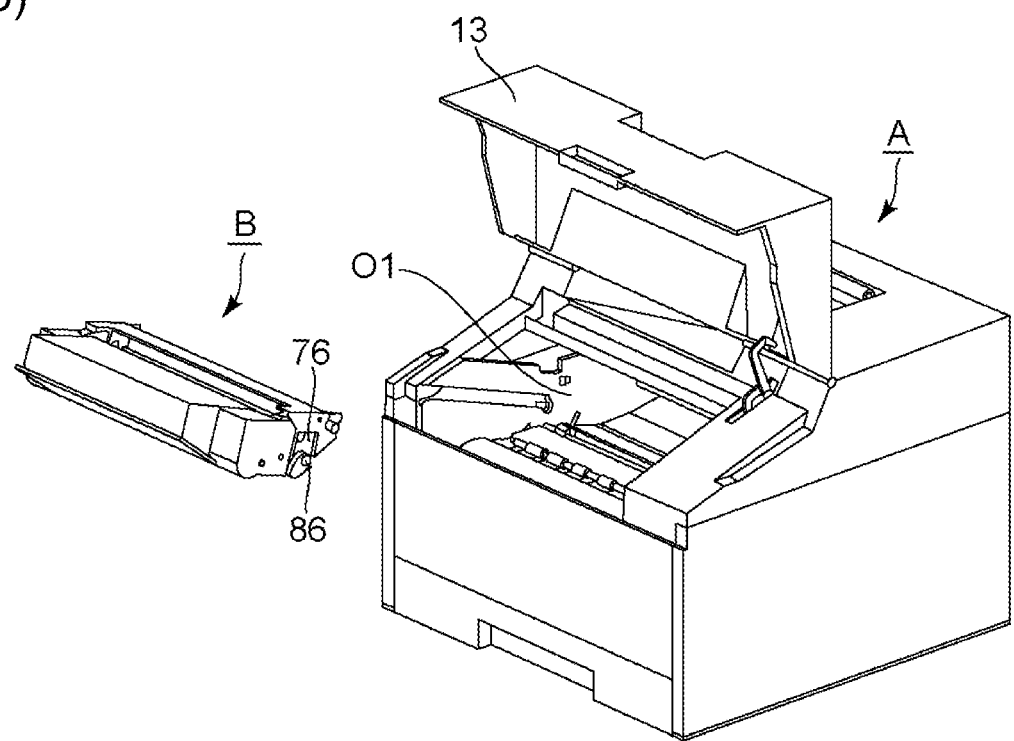
Figure 5:
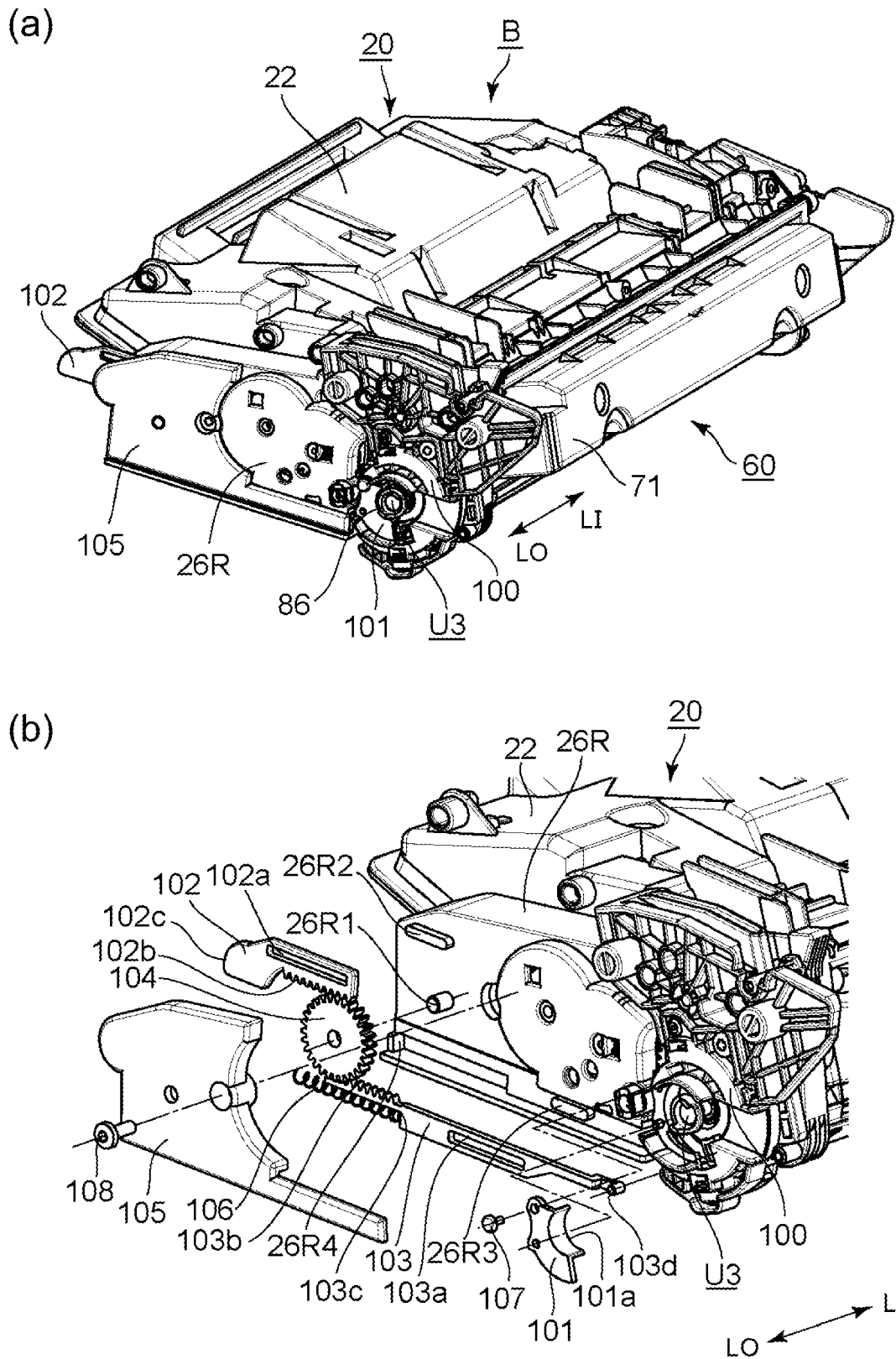
In FIG. 5, part (a) is a perspective view of the cartridge, and part (b) is a perspective view illustrating the internal mechanism of the cartridge.

Referring to FIG. 4 and FIG. 5, the operation of mounting and dismounting the cartridge B relative to the apparatus main assembly A in the above structure will be described.

FIG. 4 is an illustration of how the cartridge B is mounted to and dismounted from the main assembly A of the apparatus. Part (a) of FIG. 4 is a perspective view as seen from the non-driving side, and part (b) of FIG. 4 is a perspective view as seen from the driving side. Here, the driving side refers to the longitudinal end portion of the cartridge B provided with the moving member 86.

An opening/closing door 13 is rotatably provided on the apparatus main assembly A. FIG. 4 is a view illustrating the apparatus main assembly A in a state in which the opening/closing door 13 is opened.

The apparatus main assembly A is provided with an opening O1, and the inside of the apparatus main assembly A is provided with a mounting space for the cartridge B. The inside of the apparatus main assembly A is provided with a driving shaft 110 (drive transmission member) and a guide member 12 as a guide mechanism.

Figure 20:
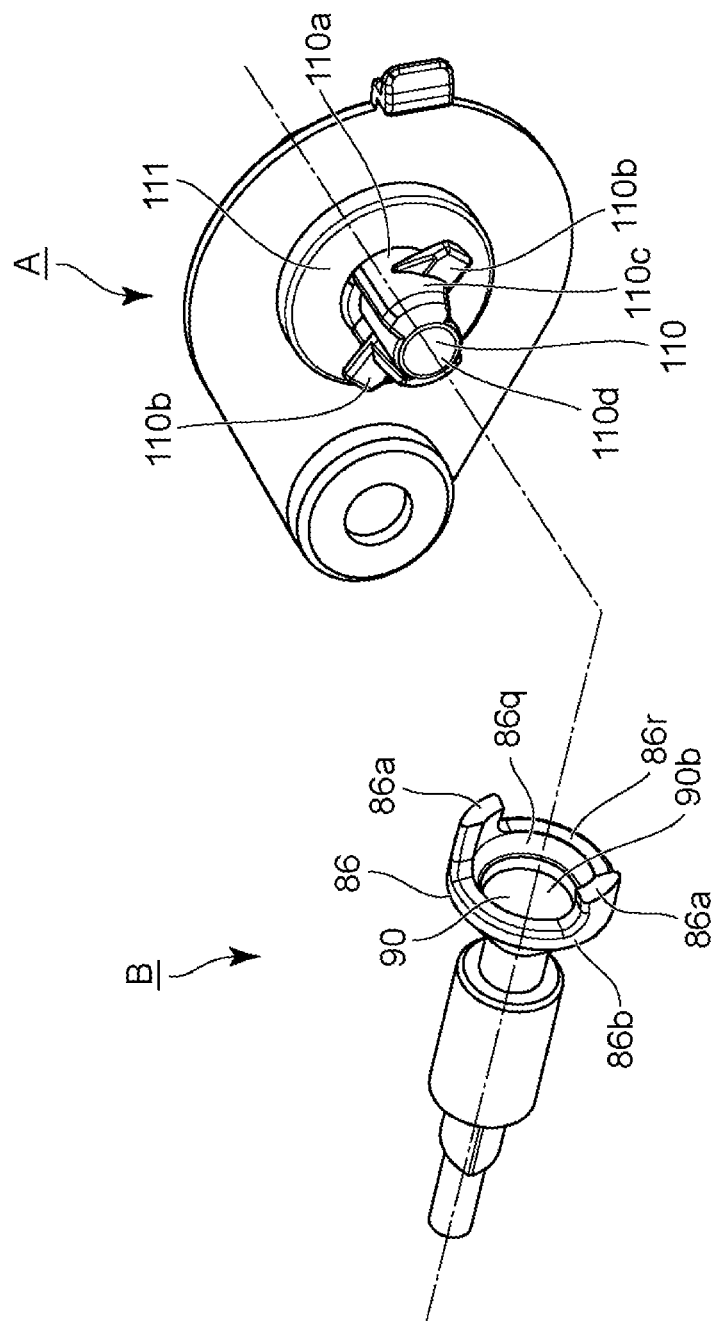
FIG. 20 is a perspective view illustrating the relationship between the coupling and the driving shaft of the apparatus main assembly.

Here, the driving shaft 110 is provided on the apparatus main assembly A side, and is a drive transmission mechanism on the main assembly side which transmits the driving force to the cartridge B mounted in the apparatus main assembly A, and it engages with the moving member 86 of the cartridge B. By the driving shaft 110 rotating after engagement the rotational force can be transmitted to the cartridge B. Here, the driving shaft 110 is supported by the apparatus main assembly A so as to be rotatable about an axis L4. In addition, the driving shaft 110 includes a drive application portion 110*b* as an application unit that applies the rotational force (FIG. 20).

In addition, the guide member 12 as a guide mechanism is a main assembly side guide member for guiding the cartridge B into the apparatus main assembly A. The guide member 12 may be a plate-like member provided with a guide groove. In addition, the structure may be such that the upper end of the guide member 12 brought into contact with the lower surface of the cartridge B to guide the mounting and dismounting of the cartridge B while supporting the cartridge B at the lower side.

FIG. 5 is a perspective view of the cartridge B according to the embodiment of the present invention.

Part (a) of FIG. 5 is a general arrangement of the cartridge B. Part (b) of FIG. 5 is a view illustrating a mechanism for operating the moving member 86.

In part (a) of FIG. 5, the cartridge B includes the developing unit 20 and the cleaning unit 60. The cleaning unit 60 includes a cleaning frame 71. The following are disposed on the side surface of the cleaning frame 71. They are a coupling unit U3 including a moving member 86, a bearing 100 rotatably supporting the drum unit U1, and a restricting member 101 fixed to the bearing 100 to restrict movement of the coupling unit U3 to the longitudinally outer side LO.

The developing unit 20 includes a toner storage frame 22 containing toner therein.

The developing unit 20 includes a toner storage frame 22 containing toner therein. The second side member 26R is provided on the side surface of the toner storage frame 22. A first lever 102 and a cover 105 are provided on the side surface of the second side member 26R.

Part (b) of FIG. 5 is an exploded perspective view at the time when the restricting member 101 and the cover 105 are removed. The restricting member 101 is fixed to the bearing 100 with a screw 107. The end surface 101*a* of the restricting member 101 is capable of being in contact with the end surface 92*a* of a rotation cam 92 which will be described hereinafter with reference to FIG. 9, and it regulates the movement of the rotary cam 92 to the longitudinally outer side LO.

The second side member 26R is provided on the side surface with a projection 26R1, a projection 26R2, and a projection 26R3. The first lever 102, the second lever 103, a gear 104, the cover 105, a spring 106 as an urging member or an elastic member, and a screw 108 are mounted to the second side member 26R.

Figure 6:
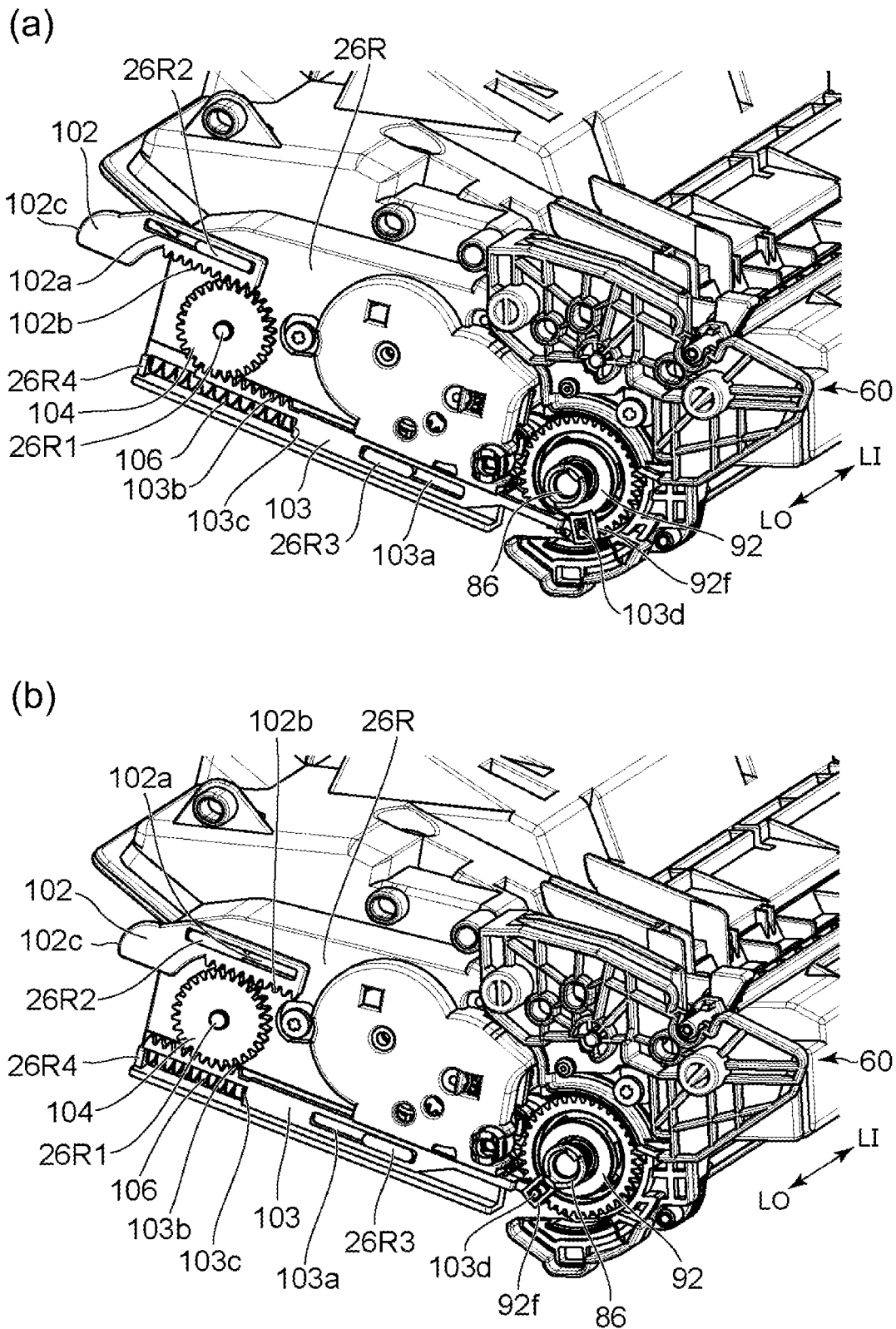
In FIG. 6, part (a) and part (b) are perspective views illustrating the operation of the cartridge.

Referring to part (b) of FIG. 5, part (a) of FIG. 6, and part (b) of FIG. 6, the mechanism for operating the moving member 86 will be further described.

Part (a) of FIG. 6 shows a state in which the moving member 86 is retracted toward the longitudinally inner side LI (a retracted position or a driving force non-transmission position).

Part (b) of FIG. 6 shows a state in which the moving member 86 projects toward the longitudinally outer side LO (advanced position, projecting position or driving force transmitting position).

The first lever 102 has a groove 102*a*, a rack 102*b* in which gear teeth are formed, and an end surface 102*c*. The groove 102*a* of the first lever 102 is slidably supported by the projection 26R2 of the second side member 26R.

The second lever 103 has a groove 103*a*, a rack 103*b* in which gear teeth are formed, an end surface 103*c*, and a cylindrical portion 103*d* (also part (b) in FIG. 5). The groove 103*a* of the second lever 103 is slidably supported by the projection 26R3 of the second side member 26R.

The gear 104 is rotatably supported by the projection 26R1 of the second side member 26R. The gear 104 is in meshing engagement with the rack 102*b* of the first lever 102 and the rack 103*b* of the second lever 103.

The spring 106 is provided between the end surface 26R4 of the second side member 26R and the end surface 103*c* of the second lever 103. The spring 106 as an urging member or an elastic member urges the second lever 103 in the direction to move it toward the cleaning unit 60 side. In this embodiment, the spring 106 is a compression spring. Therefore, the spring 106 functions to move the second lever 103 toward the cleaning unit 60 side. As a result, with the cartridge B removed from the apparatus main assembly A, the first lever 102 and the second lever 103 are positioned in the state shown in part (a) of FIG. 6.

The cylindrical portion 103*d* of the second lever 103 engages with the engaging portion 92*f* of the rotation cam 92 described hereinafter with reference to Figure. Therefore, the structure is such that the rotating cam 92 rotates with the movement of the second lever 103.

As shown in part (b) of FIG. 6, when the end surface 102*c* of the first lever 102 is pushed toward the cleaning unit 60 side, the first lever 102, the gear 104, the second lever 103, and the rotating cam 92 move such that the moving member 86 projects towards the longitudinal outer LO.

Figure 7:
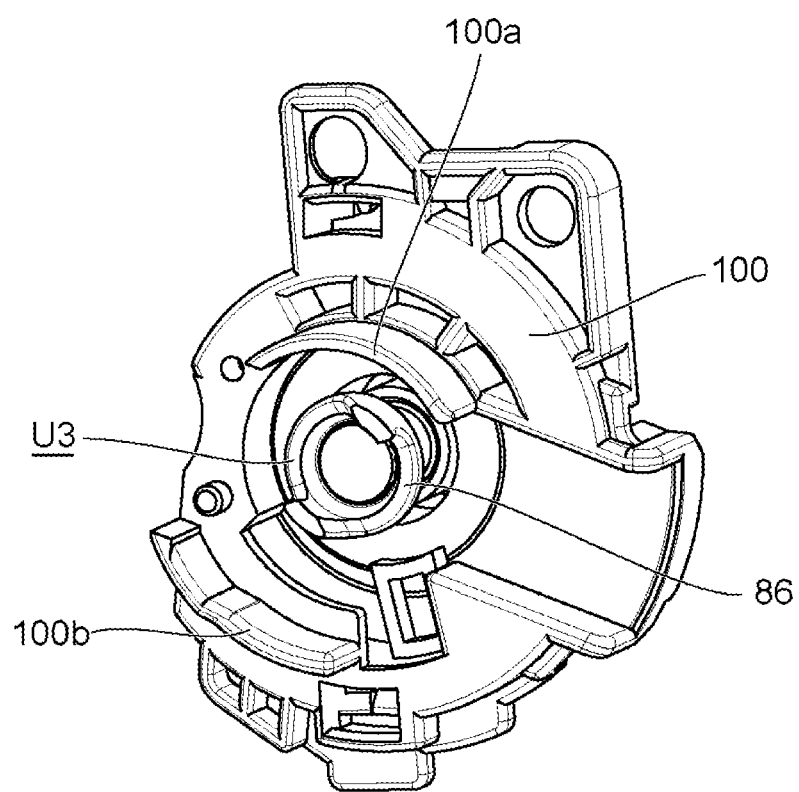
FIG. 7 is a perspective view illustrating the coupling unit.

FIG. 7 is an enlarged view of the coupling unit U3 and the bearing 100.

In FIG. 7, the bearing 100 accommodates and supports the coupling unit U3. That is, the bearing 100 rotatably supports the drum cylinder by way of a coupling unit U3 (driving side drum flange 87). The bearing 100 is provided with a projection 100*a* and a projection 100*b* around the moving member 86. The projection 100*a* and the projection 100*b* are used for positioning with respect to the apparatus main assembly A.

Figure 8:
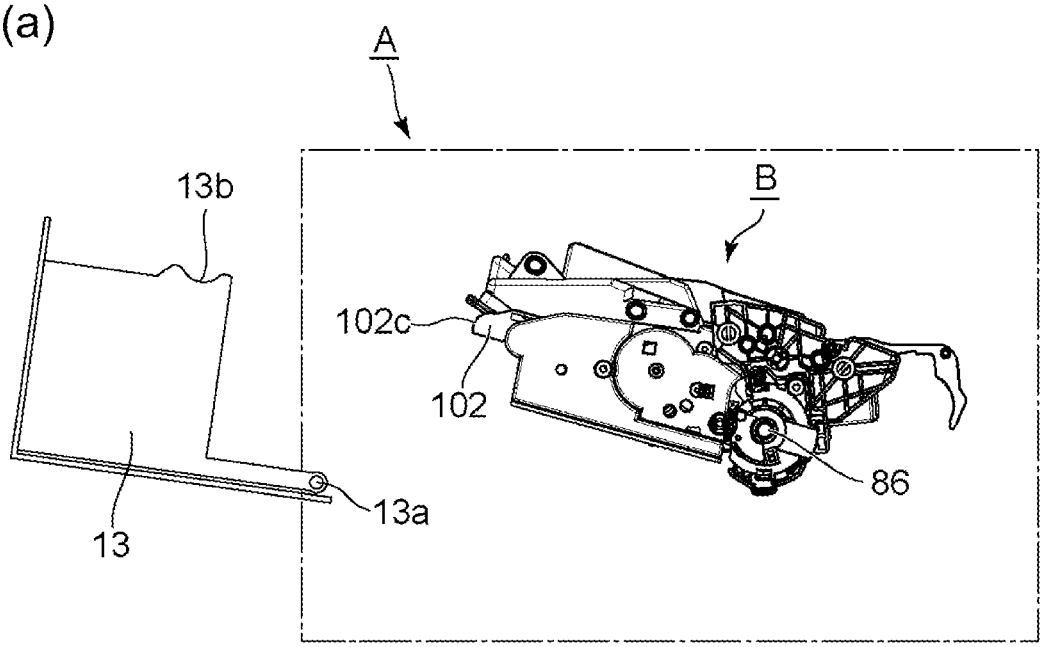
In FIG. 8, part (a) and part (b) are side views illustrating the operation when the opening and closing door of the image forming apparatus is opened and closed.
Figure 8:
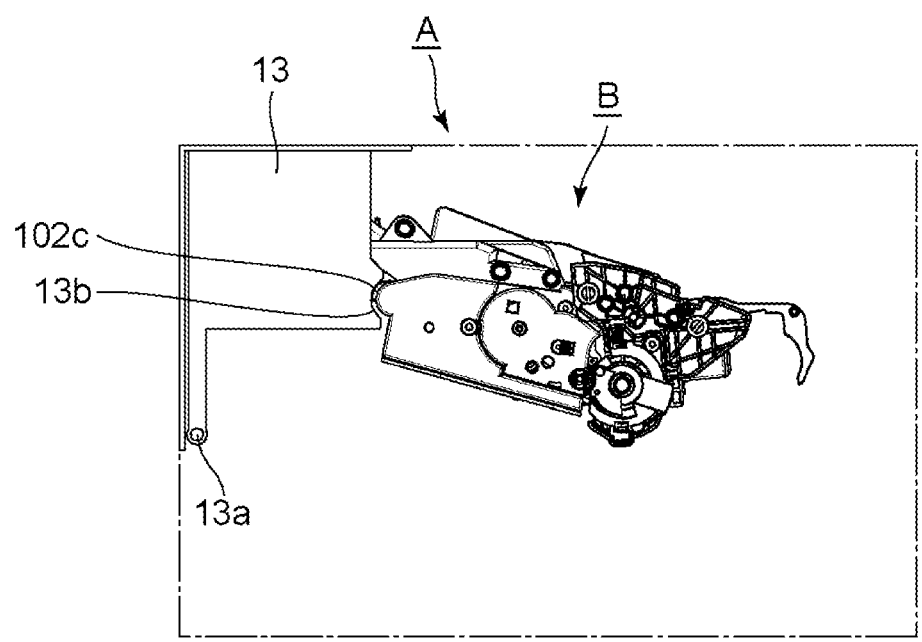

FIG. 8 is a view illustrating the operation for advancing and retracting the moving member 86. FIG. 8 shows the cartridge B and the opening/closing door 13 of the apparatus main assembly A. The opening/closing door 13 is rotatable about the rotation shaft 13*a*. In addition, the opening/closing door 13 has an engaging portion 13*b* which engages with the first lever 102.

Part (a) of FIG. 8 shows the state, in which the cartridge B is inserted into the apparatus main assembly A by the user, and is held by the guide member 12 or the like of the apparatus main assembly A described above. In part (a) of FIG. 8, the opening/closing door 13 of the apparatus main assembly A is in an open state.

Part (b) of FIG. 8 shows a state in which the opening/closing door 13 is closed. The opening/closing door 13 rotates in the direction approaching to the cartridge B about the rotation shaft 13*a*. In the process of the door 13 being closed, the end surface 102*c* of the first lever 102 of the cartridge B is pressed by the engaging portion 13*b* of the opening/closing door 13 of the apparatus main assembly A. By the first lever 102 being pressed, the moving member 86 projects toward the longitudinally outer side LO.

Figure 9:
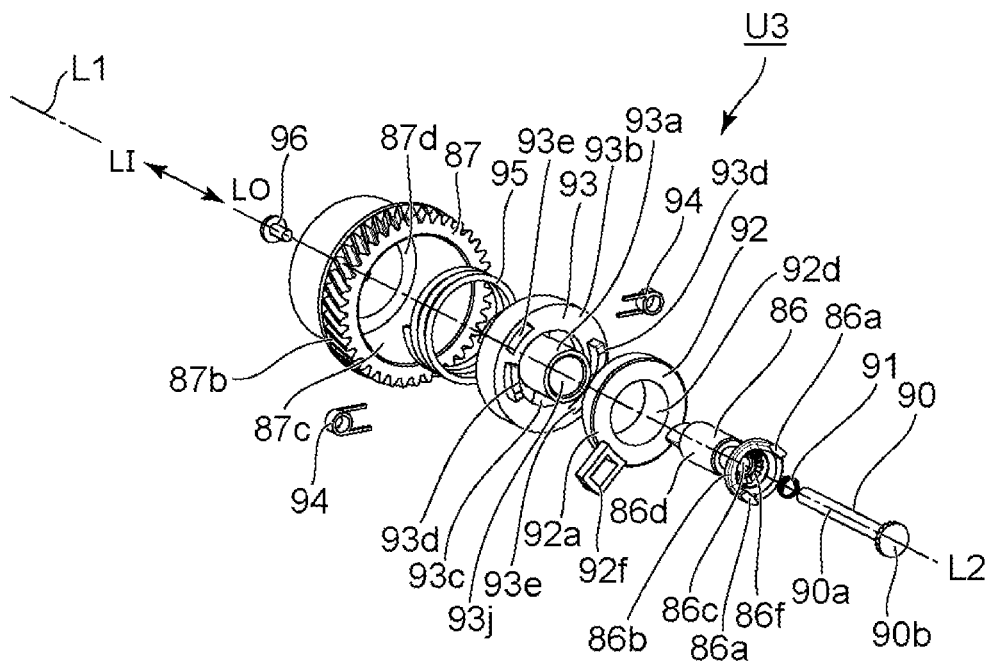
In FIG. 9, part (a) and part (b) are perspective views illustrating the internal mechanism of the coupling unit.
Figure 9:
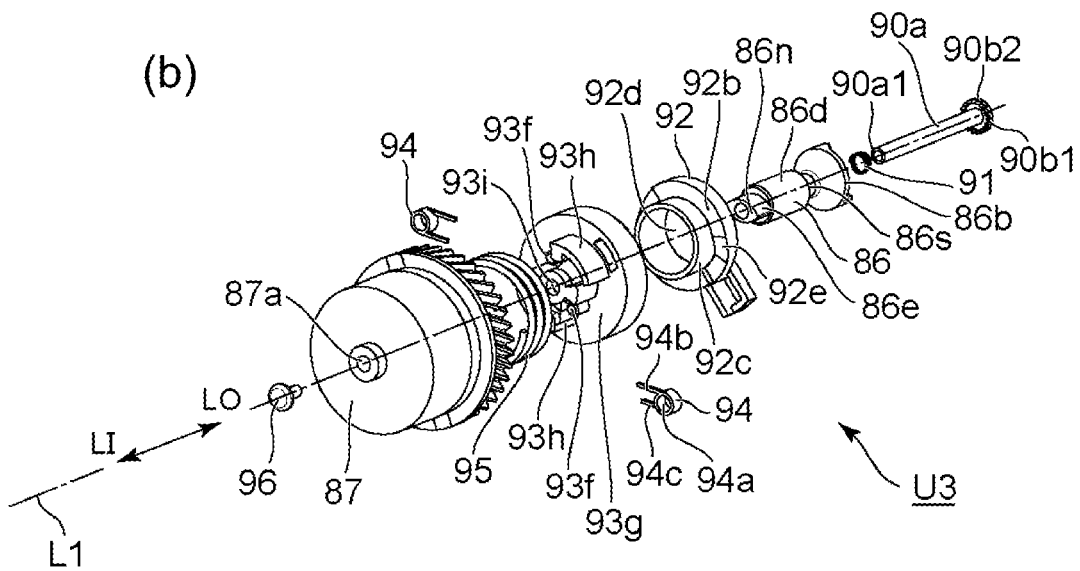

Subsequently, referring to FIG. 9, a internal structure of the coupling unit U3 for receiving a rotational force from the driving shaft 110 of the apparatus main assembly A will be described. Part (a) and (b) of FIG. 9 are exploded perspective views of the coupling unit U3. The longitudinally outer side is referred to as LO, and the longitudinally inner side is referred to as LI.

The coupling unit U3 includes a coupling shaft 90, a coupling spring 91, the moving member 86, the rotating cam 92, a linear motion cam 93, a linear motion cam pressing spring 95, the driving side flange 87, a torsion spring 94, and a fixing screw 96. Details will be described hereinafter, but the coupling shaft 90 and the moving member (moving coupling member 86) are collectively referred to as the coupling member.

Figure 10:
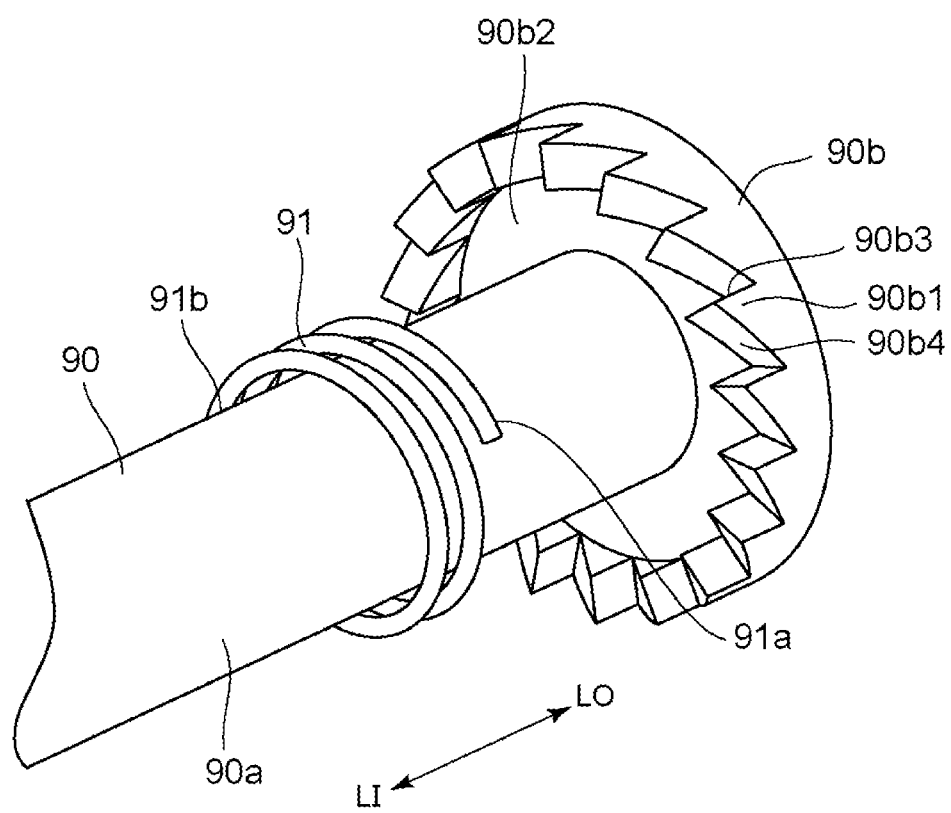
FIG. 10 is a perspective view illustrating the internal mechanism of the coupling unit.

The coupling shaft 90 is provided on the driving side flange 87. In this example, the coupling shaft 90 is fixed to the driving side flange 87 using a fixing screw 96. In this example, the coupling shaft 90 is provided coaxially with the rotation axis L1 of the drum cylinder 62. In detail, the fixing screw 96 passes through the hole 87a of the driving side flange 87, is inserted into the hole 90a1 of the coupling shaft 90, and is fixed by a screw. The coupling shaft 90 has a free end portion 90b as a restricting portion (retaining portion) at the longitudinally outer side LO (longitudinal outer end portion) and a shaft portion (column portion) 90a at the longitudinally inner side LI. The free end portion 90b has a relatively large diameter as compared with the shaft portion 90a. The longitudinal inner LI of the free end portion 90b it has an engaging portion 90b1 as a drive transmission portion consisting of a plurality of irregularities. The longitudinal inner LI of the free end portion 90b is provided with an engaging portion 90b1 as a drive transmission portion consisting of a plurality of recesses and projections. The radially inner side of the engaging portion 90b1 has an end surface 90b2 (an enlarged view is shown in FIG. 10).

The moving member 86 has a projection 86a (driving force receiving portion) that projects toward the longitudinally outer side LO in the direction of the rotation axis L2. In this embodiment, the moving member 86 is provided with two projections 86a. The two projections 86a are disposed at positions symmetrical to each other with respect to the axis L2. The projection 86a projects from the base 86b. A shaft 86s, a shaft 86d, and an approximately oval cylinder 86e are connected in this order from the base 86b to the longitudinally inner side, the LI. The moving member 86 is provided with a through hole 86c and a engaging portion 86f as a driving force transmitting portion having a plurality of recesses and projections, concentrically with the rotation axis L2. The engaging portion 86f (shown in a enlarged view in part (a) of FIG. 11) is radially inward of the base 86b and adjacent to the longitudinally outer side LO of the through hole 86c. The coupling shaft 90 is inserted into the through hole 86c of the moving member 86. In other words, the coupling shaft 90b passes through the moving member 86 (small diameter portion 86y). The coupling spring 91 is mounted around the shaft portion 90a of the coupling shaft 90, and is provided between an end surface 90b2 of the free end portion 90b as a restricting portion of the coupling shaft 90 and the moving member 86. In other words, the coupling spring 91 is disposed at the free end 86x of the moving member 86. Here, the coupling spring 91 may be provided on at least a portion of the free end 86x and the small diameter portion 86y of the moving member 86. However, providing it at the free end 86x can afford more latitude in the design of the coupling spring 91. The structure is such that the engaging portion 90b1 as a driving force receiving portion of the coupling shaft 90 and the engaging portion 86f as a driving force transmitting portion of the moving member 86 can be engaged and disengaged with each other. By this, a driving force is transmitted or blocked between the moving member 86 and the coupling shaft 90.

Here, the engaging portion 90b1 functions as a regulating portion, and the engaging portion 86f functions as a regulated portion. By contact between the regulating portion (engaging portion 90b1) and the regulated portion (engaging portion 86f), the coupling shaft 90 can regulate the movement of the moving member 86. That is, the movement of the moving member 86 away from the driving side flange 87 (or the drum cylinder 62) can be restricted.

In this embodiment, the engaging portion 86f functions both as a drive transmission portion and as a regulated portion, the engaging portion 90b1 Functions both as a driving force receiving portion and as a regulating portion. However, it is possible to separate these functions. Here, the combination of the functions as in this embodiment is superior to the structure not combining the functions in terms of downsizing and rigidity. Here, the engaging portion 86f of this embodiment is disposed outside the small diameter portion 86y in the rotational radius direction of the moving member 86.

In this embodiment, the engaging portion 86f is provided at the free end 86x of the moving member 86. However, the engaging portion 86f may be provided across the free end 86x of the moving member 86 and a connecting portion 86y, or may be provided only at the connecting portion 86y of the moving member 86. That is, the engaging portion 86f may be provided on at least a part of the free end 86x of the moving member 86 and the connecting portion 86y. However, providing the engaging portion 86f only at the free end 86x of the moving member 86 improves the design latitude and the reliability of the drive transmission and now-transmission.

The rotating cam 92 is provided so as to surround the moving member 86. The longitudinally outer side LO of the rotating cam 92 has an end surface 92a. The longitudinally inner side LI of the rotating cam 92 has the end surface 92b provided with a cam 92e, and a cylindrical portion 92c provided with a through hole 92d at the center.

The linear motion cam 93 has a cylindrical portion 93a, a hole 93j, a outer end surface 93b, a hole 93c, a cam 93d, a hole 93e, a shaft 93f, a inner end surface 93g, a wall 93h, and a hole 93i. A hole 93j is provided at the center of the cylindrical portion 93a. The cam 93d projects from the outer end surface 93b to the longitudinally outer side LO. A hole 93c is disposed around the cylindrical portion 93a. The holes 93e are provided at least in the outer end surface 93b. The hole 93e may be a through hole. The shaft 93f and the wall 93h are disposed so as to project from the inner end surface 93g toward the longitudinal inner LI side. The hole 93i is provided in the longitudinally inner side LI of the linear motion cam 93. The shaft portion 90a of the coupling shaft 90 is accommodated in the hole 93i.

The shaft 86d of the moving member 86 is accommodated in the hole 93j. The cylindrical portion 92c of the rotating cam 92 is accommodated in the hole 93c. The structure is such that the cam 93d of the linear motion cam 93 and the end surface 92b including the inclined surface 92e of the rotation cam 92 abut to each other.

The torsion spring 94 has a hole 94a, an arm 94b and an arm 94c. By fitting the hole 94a of the torsion spring 94 around the shaft 93f, the torsion spring 94 is held by the shaft 93f. The arm 94c abuts on the radially inner surface of the wall 93h provided on the linear motion cam 93. The arm 94b abuts to the approximately oval cylinder 86e provided on the moving member 86.

In this embodiment, two cams 93d, two holes 93e, two shafts 93f, and two walls 93h are provided.

The driving side flange 87 has a hole 87a in the longitudinally inner side LI. The driving side flange 87 has a gear portion 87b, a hole 87c, and a end surface 87d at the longitudinally outer side LO.

The linear motion cam pressing spring 95 as the urging member or the elastic member is accommodated in the hole 87c of the driving side flange 87. The linear motion cam pressing spring 95 abuts to the end surface 87d of the driving side flange 87 at the longitudinally inner side LI, and abuts to the end surface 93g of the linear motion cam 93 at the longitudinally outer side LO.

FIG. 10 is an enlarged perspective view of the coupling shaft 90 and the coupling spring 91 as the urging member or elastic member. It is a Figure for explaining the free end portion 90b as a regulation portion of coupling shaft 90.

The engaging portion 90b1 as the driving force receiving portion (intermediate driving force receiving portion, engaging portion) including a plurality of recesses and projections is provided at the free end portion 90b as the regulated portion of the coupling shaft 90. In addition, the coupling shaft 90 has a shaft portion 90a on the longitudinally inner side LI of the free end portion 90b. An arbitrary projection of the free end portion 90b has a surface 90b3 on one side in the circumferential direction and a surface 90b4 on the opposite side in the circumferential direction. In this embodiment, the surface 90b3 is a drive transmission surface (shaft side driving force receiving portion or flange side driving force receiving portion).

The coupling spring 91 is provided around the shaft portion 90a. An end surface 91a of the coupling spring 91 abuts to the end surface 90b2 of the free end portion 90b, in the assembled state.

Figure 11:
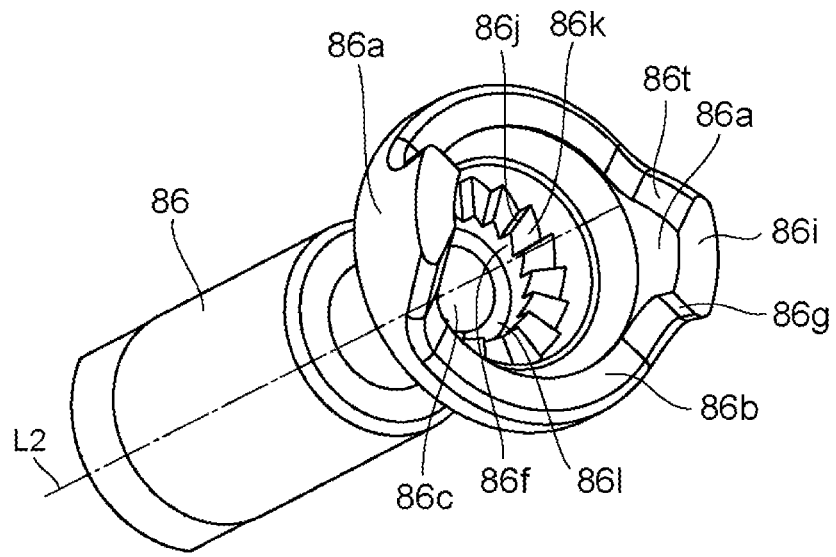
In FIG. 11, part (a) and part (b) are perspective views illustrating the coupling structure.
Figure 11:
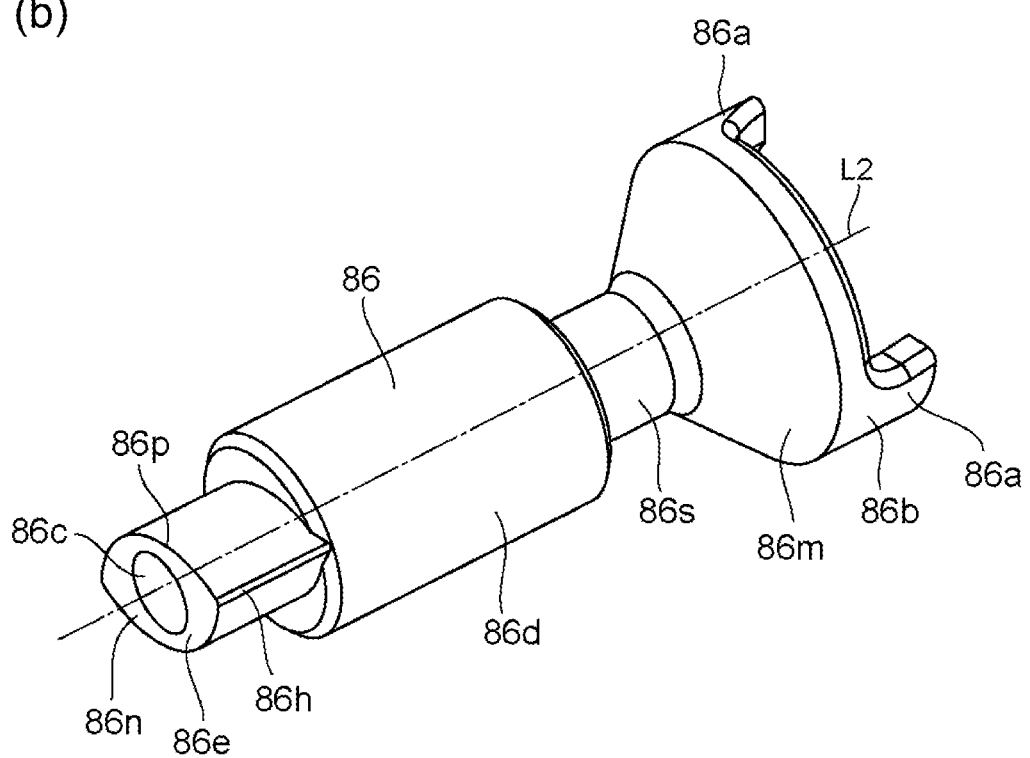
Figure 12:
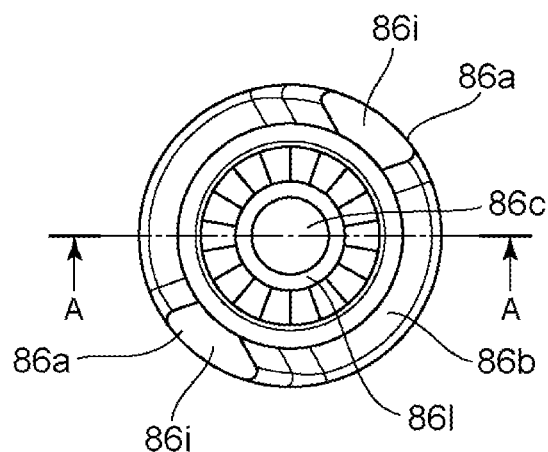
In FIG. 12, part (a) and part (b) are illustrations of the coupling.
Figure 12:
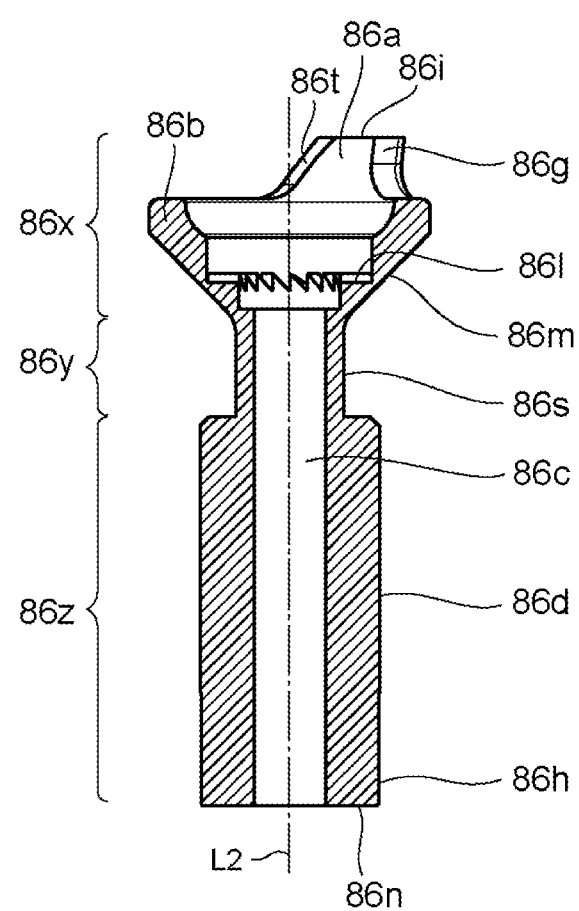
Figure 13:
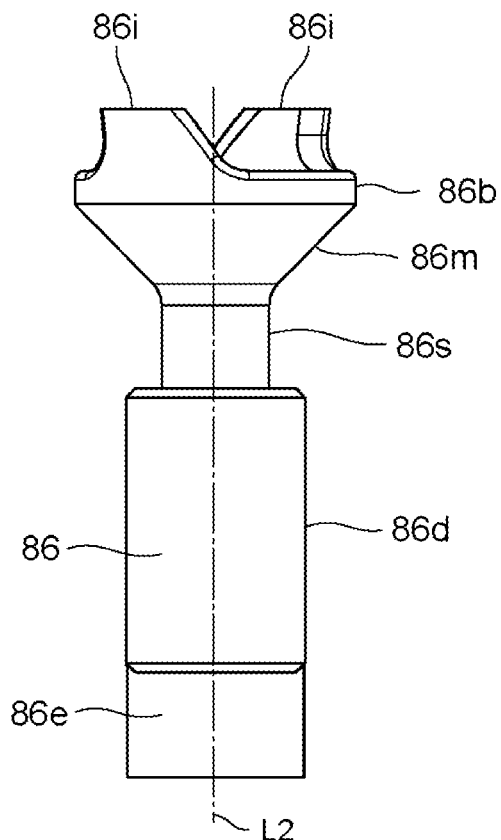
In FIG. 13, part (a) and part (b) are illustrations of the coupling.
Figure 13:
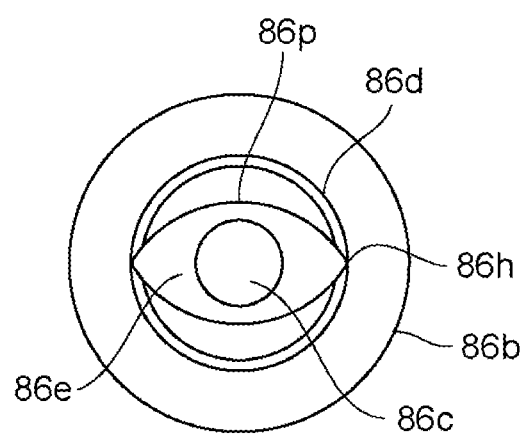

Referring to FIGS. 11, 12, and 13, the moving member 86 will be described. FIG. 11 is a enlarged perspective view, part (a) of FIG. 12 is a view seen from the side of the projection 86a, and part (b) of FIG. 12 is an A-A cross-section of part (a) of FIG. 12, Part 13 (a) is a side view, and part (b) of FIG. 13 is a view as seen from the side of the cylinder 86e.

The moving member 86 has two projections 86a. The projection 86a has a surface 86g as a driving force receiving portion on one end side in the circumferential direction and a surface 86t on the other end side in the circumferential direction. It is preferable that the surface 86g and the surface 86t a slanted. A free end surface 86i is provided at the free end of the projection 86a.

In addition, the moving member 86 has a engaging portion 86f as a driving force transmitting portion provided with a plurality of recesses and projections. A projection of the engaging portion 86f has a surface 86j on one side in the circumferential direction and a surface 86k on the opposite side in the circumferential direction. In this embodiment, the surface 86j is a drive transmission surface (drive power transmission portion). When the coupling shaft 90 and the moving member 86 are in the drive transmission state, a surface 90b3 as the driving force receiving portion of the coupling shaft 90 and the surface 86j as the driving force transmitting portion of the moving member 86 contact each other, so that the moving member 86 transmits the driving force to the coupling shaft 90. The moving member 86 has an end surface 86l. The end surface 86l abuts to the end surface 91b (FIG. 10) of the coupling spring 91 in the assembled state.

As shown in FIG. 12, the moving member 86 has a outer portion (free end) 86x and the shaft 86s as the small diameter portion 86y provided closer to the drum cylinder 62 than the outer portion (free end) 86x. Furthermore, the moving member 86 has an inner portion 86z provided at a position closer to the drum cylinder 62 than the small diameter portion 86y. The outer side (free end) 86x of the moving member 86 is provided with the projection 86a, the base 86b, the shaft 86s, and an inclined portion 86m. The diameter of the shaft 86s as the small diameter portion 86y is smaller than the diameter of the outer portion (free end) 86x. In other words, the maximum rotation radius of the small diameter portion 86y is smaller than the maximum rotation radius of the outer portion (free end) 86x. Here, the maximum rotation radius is the maximum value of the distance from the rotation axis L2 of the moving member 86.

The outer side portion 86x has a portion (inclined portion 86m) gradually moving away from the axis L2 toward the free end of the moving member 86 (FIG. 12). The maximum rotation radius of the inclined portion 86m gradually increases with distance from the drum cylinder.

Furthermore, the maximum rotation radius of the small diameter portion 86y is smaller than the distance between the driving force receiving portion 86g and the rotation axis L2. The diameter of the shaft 86d is larger than the diameter of the shaft 86s. Outline distance from the axis L2 of the large diameter portion 86h of the approximately oval cylinder 86e is equal to or less than the outline distance of the outer portion from the axis L2 of the shaft 86d. The outer diameter of the small diameter (oval) portion 86p with respect to the axis L2 is smaller than the outer distance of the (oval) large diameter portion 86h with respect to the axis L2.

The moving member 86 has a through hole 86c centered on the axis L2.

The moving member 86 has a through hole 86c concentric with the axis L2.

Figure 14:
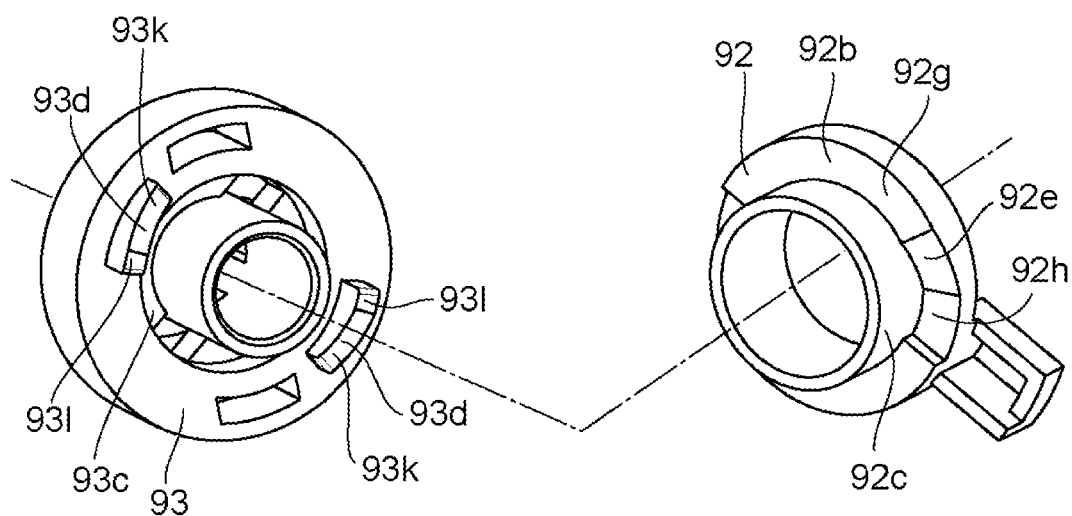
In FIG. 14, part (a) and part (b) are perspective views illustrating the internal mechanism of the coupling unit.
Figure 14:
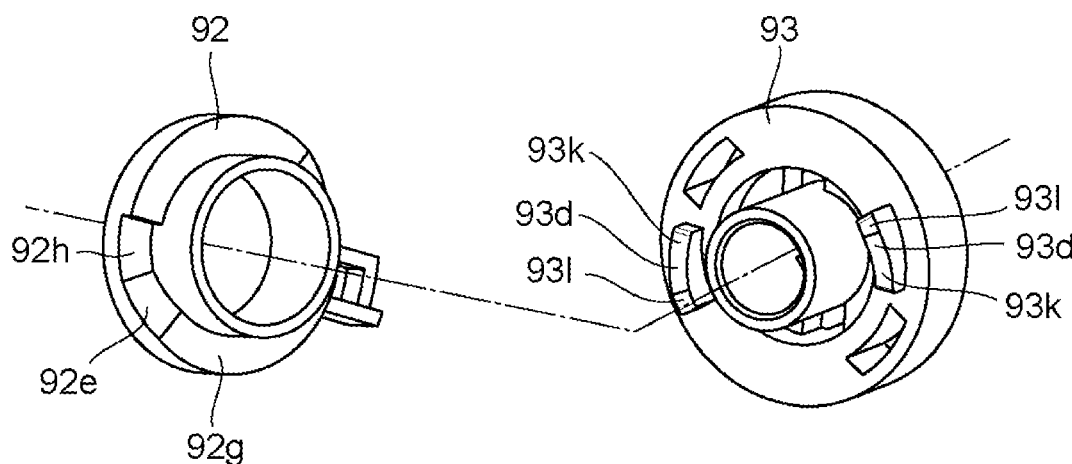

FIG. 14 is a view illustrating a contact portion between the rotary cam 92 and the linear motion cam 93. The part (a) of FIG. 14 and the part (b) of FIG. 14 show the same elements as viewed at different angles.

The cylindrical portion 92c of the rotating cam 92 is accommodated in the hole 93c of the linear motion cam 93 and supported thereby. The end surface 92b of the rotating cam 92 includes the inclined surface 92e, an end surface 92g, and an end surface 92h. The cam 93d of the linear motion cam 93 includes an inclined surface 93k and an end surface 93l.

As shown in part (a) of FIG. 6, in a state that the moving member 86 is retracted toward the longitudinally inner side LI (non-driving side), the end surface 92g of the rotating cam 92 is in contact with the end surface 93l of the linear motion cam 93.

As shown in part (b) of FIG. 6, in the state of projecting toward the longitudinally outer side LO (driving side) of the moving member 86, the end surface 92h of the rotating cam 92 is in contact with the end surface 93l of the linear motion cam 93.

Here, in the process of moving the moving member 86 from the retracted state (part (a) in FIG. 6) to the projecting state (part (b) in FIG. 6), the inclined surface 92e of the rotating cam 92 and the slope 93d of the linear motion cam 93 abut to each other.

Figure 15:
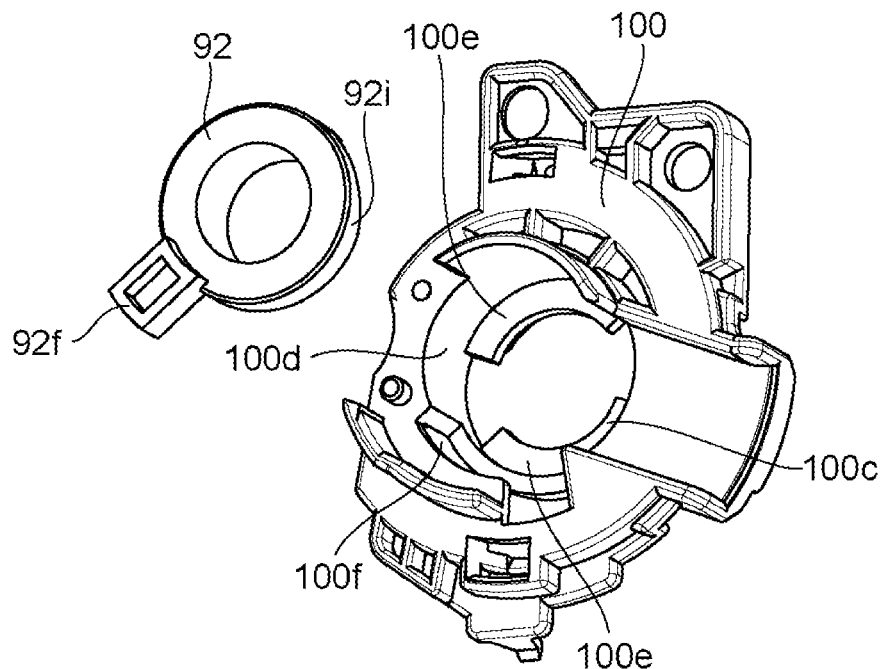
In FIG. 15, part (a) and part (b) are perspective views illustrating the internal mechanism of the coupling unit.
Figure 15:
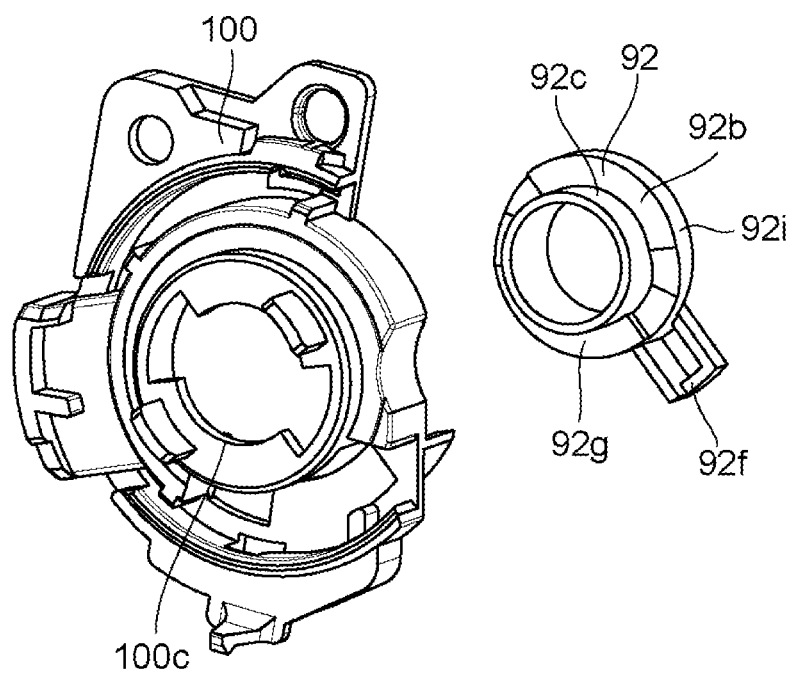

FIG. 15 is a view illustrating the structure of the bearing 100 which accommodates the rotating cam 92. The part (a) of FIG. 15 and the part (b) of FIG. 15 show the same element the as viewed at different angles.

The rotating cam 92 includes a cylindrical portion 92c, an outer cylindrical portion 92i, an engaging portion 92f, and an end surface 92b.

The rotating cam 92 includes the cylindrical portion 92c, an outer cylindrical portion 92i, engaging portion 92f, and end surface 92b. The bearing 100 includes a sector-shaped hole 100c for accommodating the cylindrical portion 92c, a hole 100d for accommodating the outer cylindrical portion 92i, a end surface 100e abutting against the end surface 92b, and a slit 100f accommodating the engaging portion 92f. The rotating cam 92 is rotatably mounted to the bearing 100.

Figure 16:
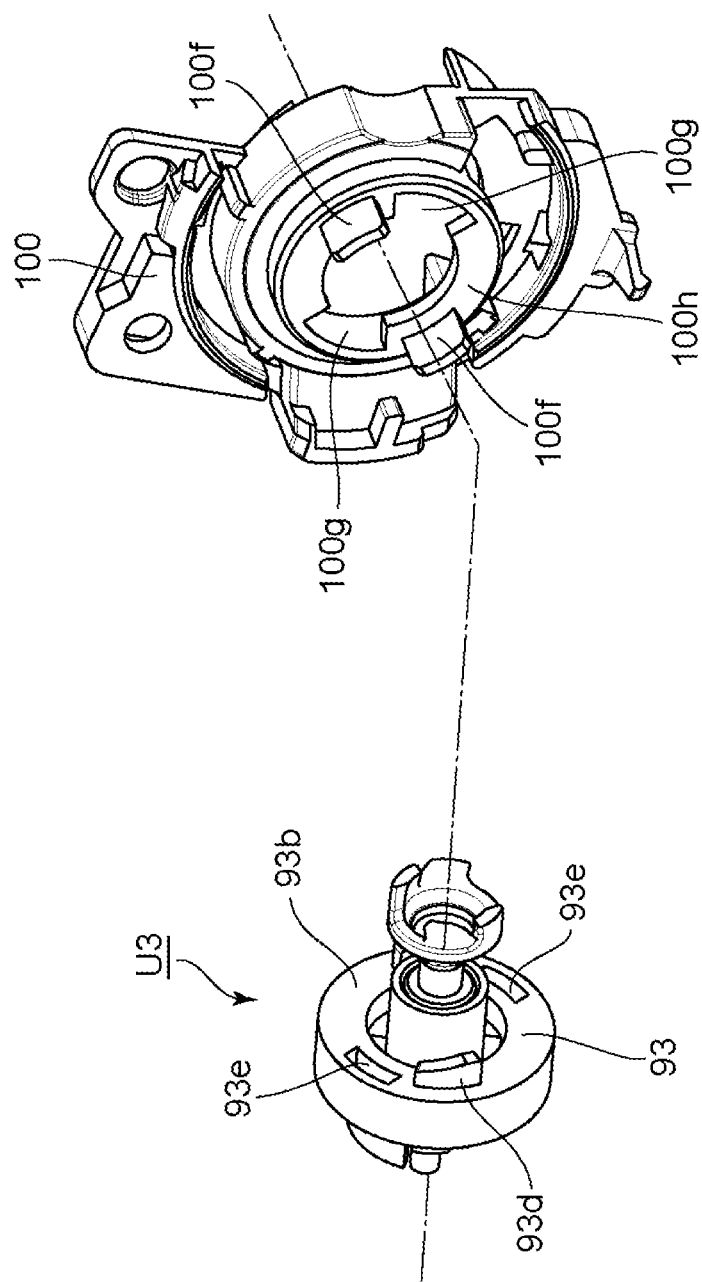
FIG. 16 is a perspective view illustrating the support structure of the coupling unit.

FIG. 16 is a view illustrating the structure of the coupling unit U3 and the bearing 100.

The coupling unit U3 includes a linear motion cam 93. The linear motion cam 93 includes the cam 93d, the hole 93e, and outer end surface 93b. The bearing 100 includes a rib 100f, a hole 100g, and a end surface 100h. The rib 100f of the bearing 100 is accommodated in the hole 93e of the linear motion cam 93. By this, the linear motion cam 93 is constituted so as to be slidable along the rotation axis L1 of the drum cylinder 62, while being regulated so as not to be rotatable relative to the bearing 100. The cam 93d of the linear motion cam 93 is accommodated in the hole 100g of the bearing 100. The outer end surface 93b of the linear motion cam 93 is constituted so as to be able to abut to the end surface 100h of the bearing 100.

Figure 17:
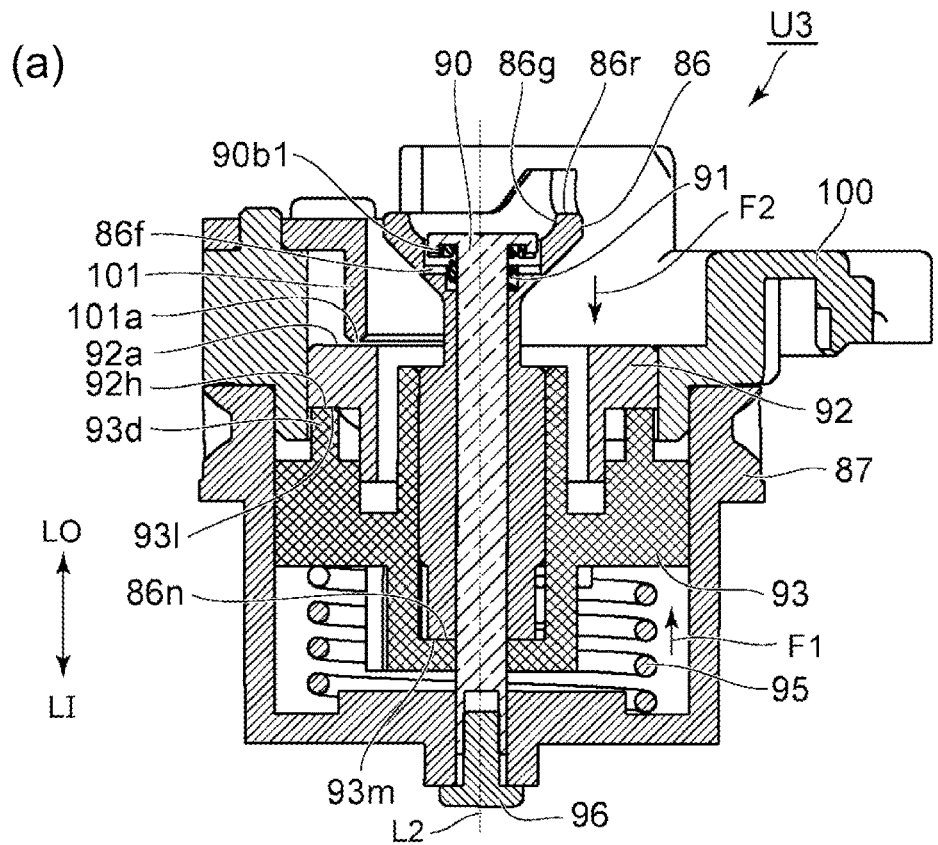
In FIG. 17, part (a) and part (b) are cross-sectional views illustrating the internal mechanism of the coupling unit.
Figure 17:
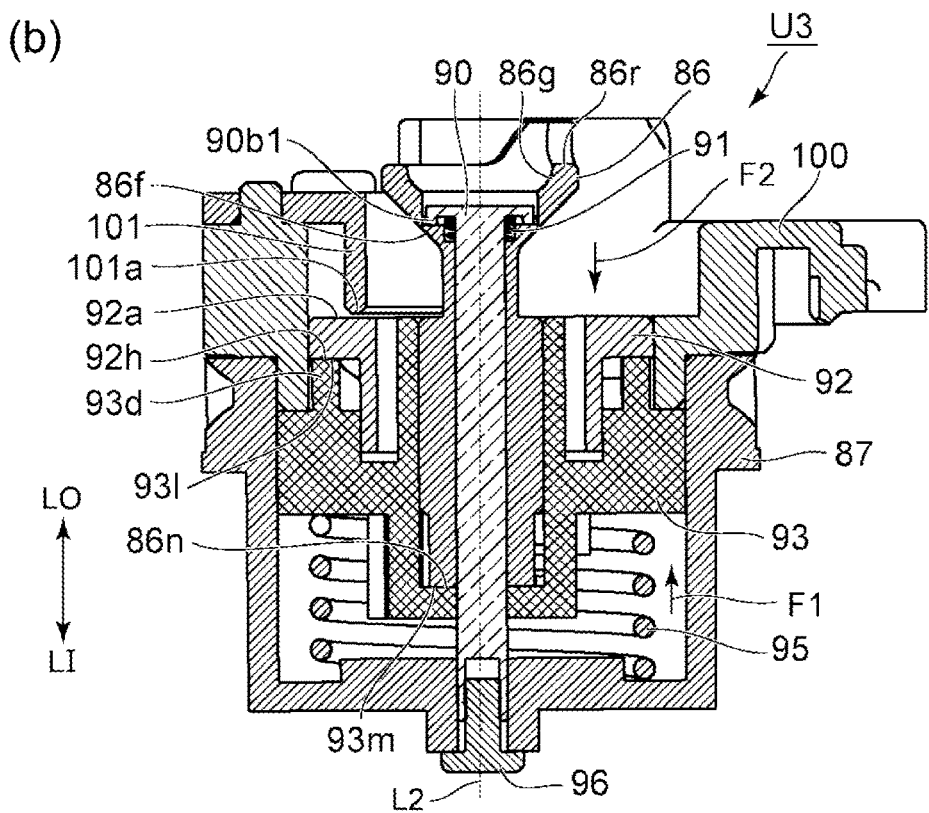
Figure 18:
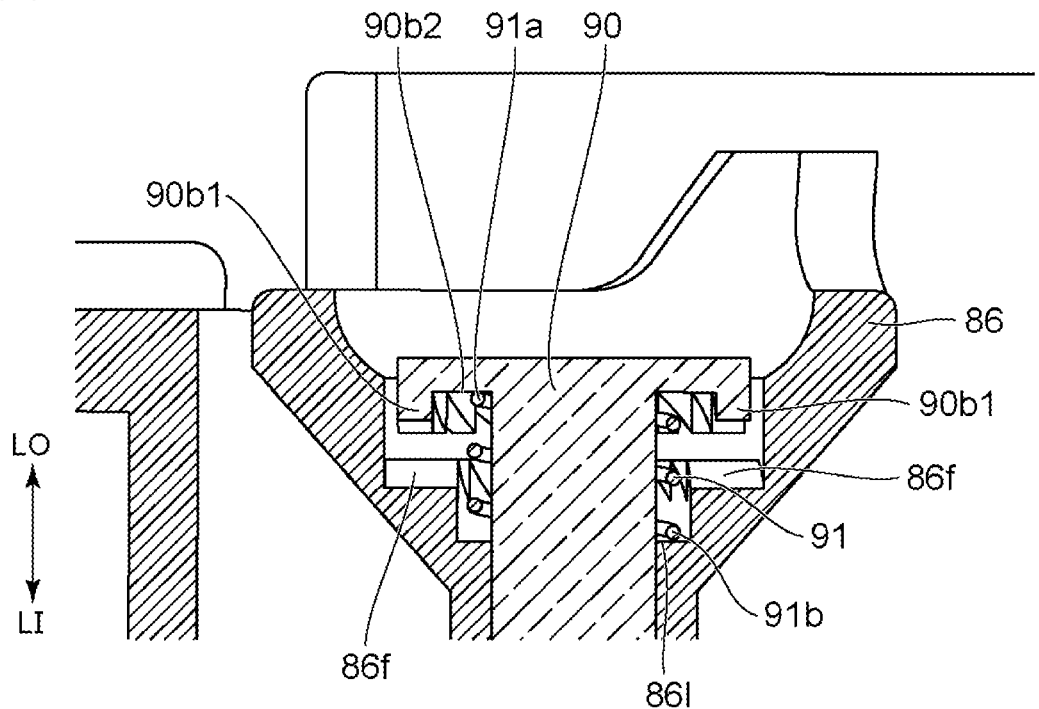
In FIG. 18, part (a) and part (b) are enlarged views of FIG. 17.
Figure 18:
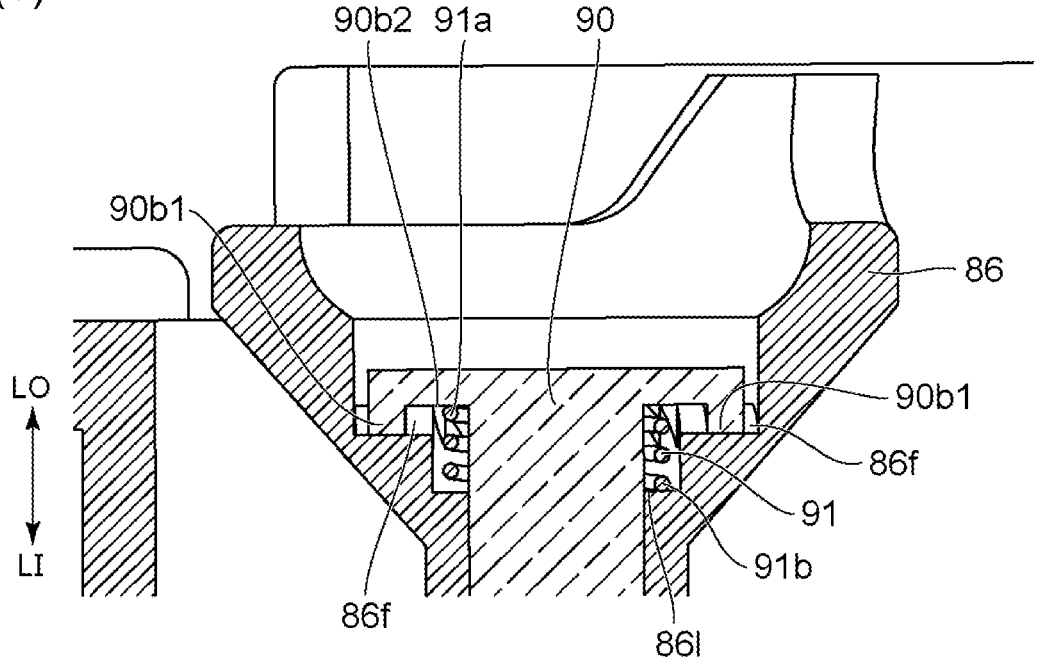

FIG. 17 is a cross-sectional view of the coupling unit U3. FIG. 18 is a partial enlarged view of FIG. 17.

Part (a) of FIG. 17 and part (a) of FIG. 18 show a state in which the moving member 86 is retracted toward the longitudinally inner side LI.

The coupling shaft 90 is held by the fixing screw 96 with respect to the driving side flange 87. The moving member 86 is supported so that it is rotatable around the axis L2, and is movable in the direction of the axis L2 relative to the coupling shaft 90. The engaging portion 90b1 of the coupling shaft 90 and the engaging portion 86f of the moving member 86 are not engaged with each other. Between the coupling shaft 90 and the moving member 86, a coupling spring 91 as a second urging member (second elastic member) is provided. The coupling spring 91 functions to move the moving member 86 relative to the coupling shaft 90 toward the longitudinally inner side LI. The end surface 91a of the coupling spring 91 abuts to the end surface 90b2 of the coupling shaft 90. The end surface 91b of the coupling spring 91 abuts to the end surface 86l of the coupling 86 (part (a) in FIG. 18). The linear motion cam 93 is disposed between the moving member 86 and the driving side flange 87. The pressing spring 95 for pressing the linear motion cam is disposed between the linear motion cam 93 and the driving side flange 87. The pressing spring 95 functional such that the linear motion cam 93 is moved relative to the driving side flange 87 toward the longitudinally outer side LO. The pressure spring 95 is provided inside the driving side flange 87. The rotating cam 92 restricts the movement of the linear motion cam 93 toward the longitudinally outer side LO. The restricting member 101 restricts the movement of the rotating cam 92 toward the longitudinally outer side LO. The restricting member 101 is fixed to the bearing 100. The bearing 100 rotatably supports the driving side flange 87 and the rotating cam 92.

Part (a) of FIG. 17 shows the state in which the moving member 86 is retracted toward the longitudinally inner side LI. In this state, the urging force of the pressing spring 95 causes the linear motion cam 93 to apply a force in the direction of the longitudinally outer side LO. By this, the cam 93d of the linear motion cam 93 abuts on the end surface 92g of the rotating cam 92. By this, the rotary cam 92 receives a force in the direction toward the longitudinally outer side LO by the linear motion cam 93. And, the end surface 92a of the rotating cam 92 is restricted from moving to the longitudinally outer side LO by the end surface 101a of the restricting member 101. The coupling spring 91 urges the moving member 86 toward the longitudinally inner side LI such that the end surface 86n (of the longitudinal inner LI) of the moving member 86 and the end surface 93m of the linear motion cam 93 abut to each other. At this time, the connection between the engaging portion 90b1 as the driving force receiving portion of the coupling shaft 90 and the engaging portion 86f as the driving force transmitting portion of the moving member 86 is broken (disengaged state)). Therefore, at this time, the rotational driving force of the moving member 86 cannot be transmitted to the coupling shaft 90. In other words, the moving member 86 at this time is located at the (driving force) non-transmission position.

Part (b) of FIG. 17 and part (b) of FIG. 18 show a state in which the moving member 86 projects toward the longitudinally outer side LO.

By the second lever 103, the rotating cam 92 is rotated to a predetermined phase (parts (a) and (b) of FIG. 6). Then, from the state in which the end surface 93l of the linear motion cam 93 abuts on the end surface 92g of the rotation cam 92, the state changes such that it abuts to the end surface 92h (also in FIG. 14). By this, the linear motion cam 93 is moved to the longitudinally outer side LO by the urging force of the linear motion cam pressing spring 95. The end surface 93m of the linear motion cam 93 pushes the end surface 86n (of the longitudinal inner LI) of the moving member 86. The urging force of the pressing spring 95 as the urging member (elastic member) is set to be larger than the urging force of the coupling spring 91 as the urging member (elastic member), and therefore, the moving member 86 moves to the longitudinally outer side LO. At this time, the engaging portion 90b1 as the driving force receiving portion of the coupling shaft 90 is engaged (connected) with engaging portion 86f as the driving force transmitting portion of the moving member 86. As a result, the rotational driving force of the moving member 86 can be transmitted to the coupling shaft 90. In other words, the moving member 86 at this time is located at the (driving force) transmitting position.

The free end portion 90b of the coupling shaft 90 restricts the movement of the moving member 86 toward the longitudinally outer side LO.

Next, the phase control mechanism of the moving member 86 will be described with reference to FIG. 19.

Figure 19:
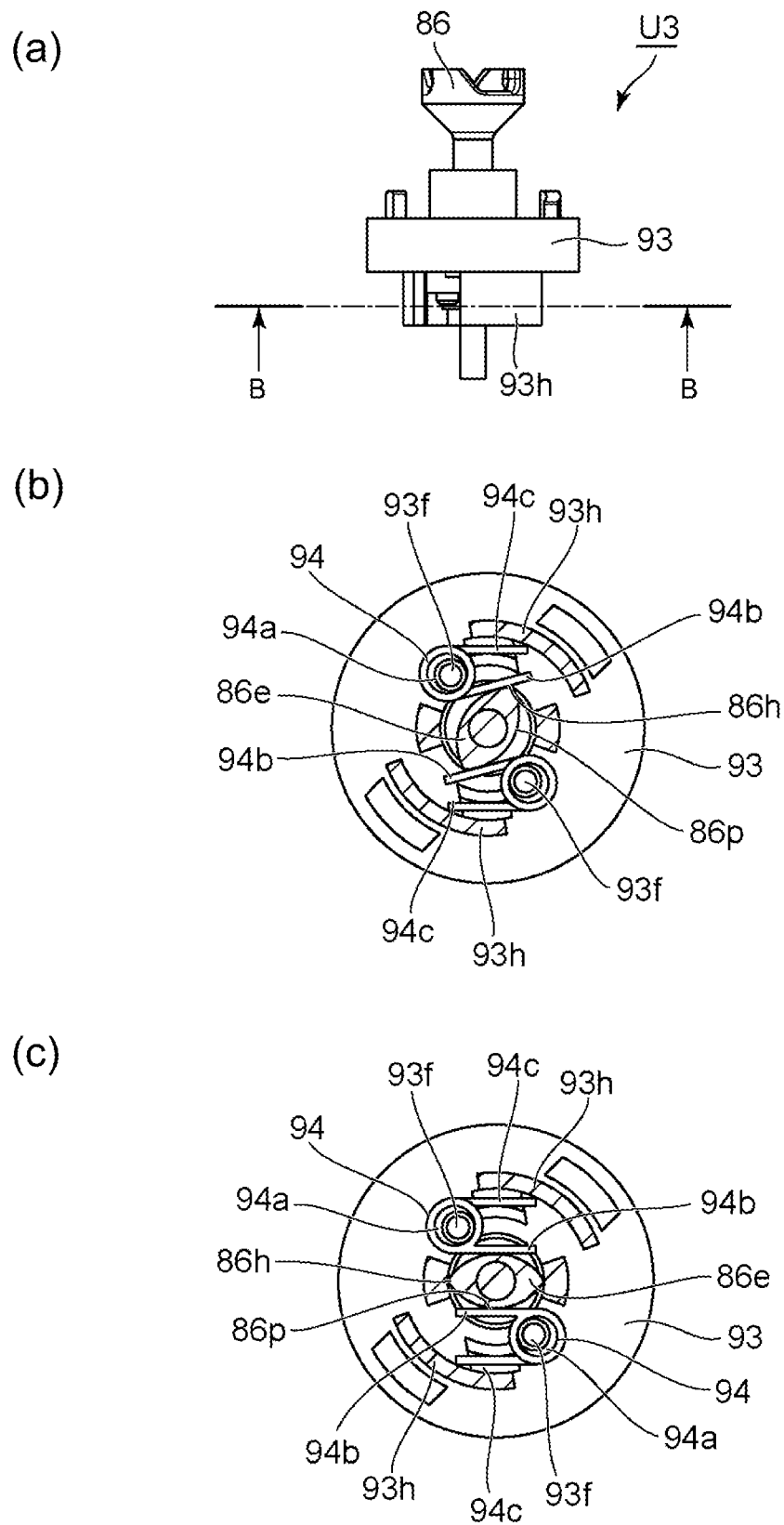
In FIG. 19, part (a), part (b) and part (c) are illustrations of the cartridge operation.

Part (a) of FIG. 19 is a side view of the coupling unit U3. The part (b) of FIG. 19 and the part (c) of FIG. 19 are the B-B cross-sections of the part (a) of FIG. 19.

Part (b) of FIG. 19 shows a state of stopping at an arbitrary phase after completion of image formation.

Part (b) of FIG. 19 shows a state of stopping at an arbitrary phase after completion of image formation. The hole 94a of the torsion spring 94 is supported by the shaft 93f of the linear motion cam 93. The arm 94c of the torsion spring 94 contacts the wall 93h of the linear motion cam 93. The arm 94b of the torsion spring 94 contacts an approximately oval cylinder 86e of the moving member 86. In the state of part (b) of FIG. 19, the arm 94b is in contact with the neighborhood of the (oval) large diameter portion 86h of the cylinder 86e. Here, the torsion spring 94 is set to exert an urging force in a direction in which the space between the arm 94b and the arm 94c expands. Therefore, by the urging force of the torsion spring 94, the moving member 86 receives the rotational force toward a phase in which the arm 94b abuts to the neighborhood of the small diameter portion (elliptic) 86p of the moving member 86. When the user opens the door 13 of the apparatus main assembly A (part (a) in FIG. 8), by the urging force of the spring 106 provided to the second side member 26R, the second lever 103 and the rotating cam 92 are moved (part (a) in FIG. 6). When the user opens the door 13 of the apparatus main assembly A (part (a) in FIG. 8), the second lever 103 and the rotating cam 92 are moved (part (a) in FIG. 6), by the urging force of the spring 106 provided on the second side member 26R.

As a result, the moving member 86 is in the state in which the moving member 86 shown in part (a) of FIG. 17 is retracted toward the longitudinally inner side (inside of the cartridge) LI. That is, the spring 106 urges the moving member 86 from the driving force transmitting position (part (b) in FIG. 17) to the driving force non-transmitting position (part (a) in FIG. 17). At this time, the engaging portion 90b1 as the driving force receiving portion of the coupling shaft 90 is in the non-engaging state with the engaging portion 86f as the driving force transmitting portion of the moving member 86, and therefore, the moving member 86 is rotated by the urging force of the torsion spring 94. The moving member 86 rotates until a phase is established in which the arm 94b is brought into contact with the neighborhood of the (elliptic) small diameter portion 86p of the moving member 86, and the rotating moment received by the moving member 86 is balanced, at a, it stops.

FIG. 20 is a view illustrating the moving member 86 and the main assembly driving shaft 110.

The cartridge B includes the moving member 86 and the coupling shaft 90. The apparatus main assembly A includes the driving shaft 110 and the bearing 111.

The driving shaft 110 includes a shaft portion 110a, a drive application portion 110b, a free end portion 110c, and a free end surface 110d. The bearing 111 supports the shaft portion 110a.

The moving member 86 is provided with a projection 86a. The coupling shaft 90 has a free end portion 90b. The coupling shaft 90 has a free end portion 90b.

With the free end portion 90b of the coupling shaft 90 being in contact with or close to the free end surface 110d of the driving shaft 110, the drive application portion 110b of the driving shaft 110 abuts to the drive force receiving portion of the projection 86a of the moving member 86. By this, the moving member 86 receives the rotational driving force from the driving shaft 110.

Figure 21:
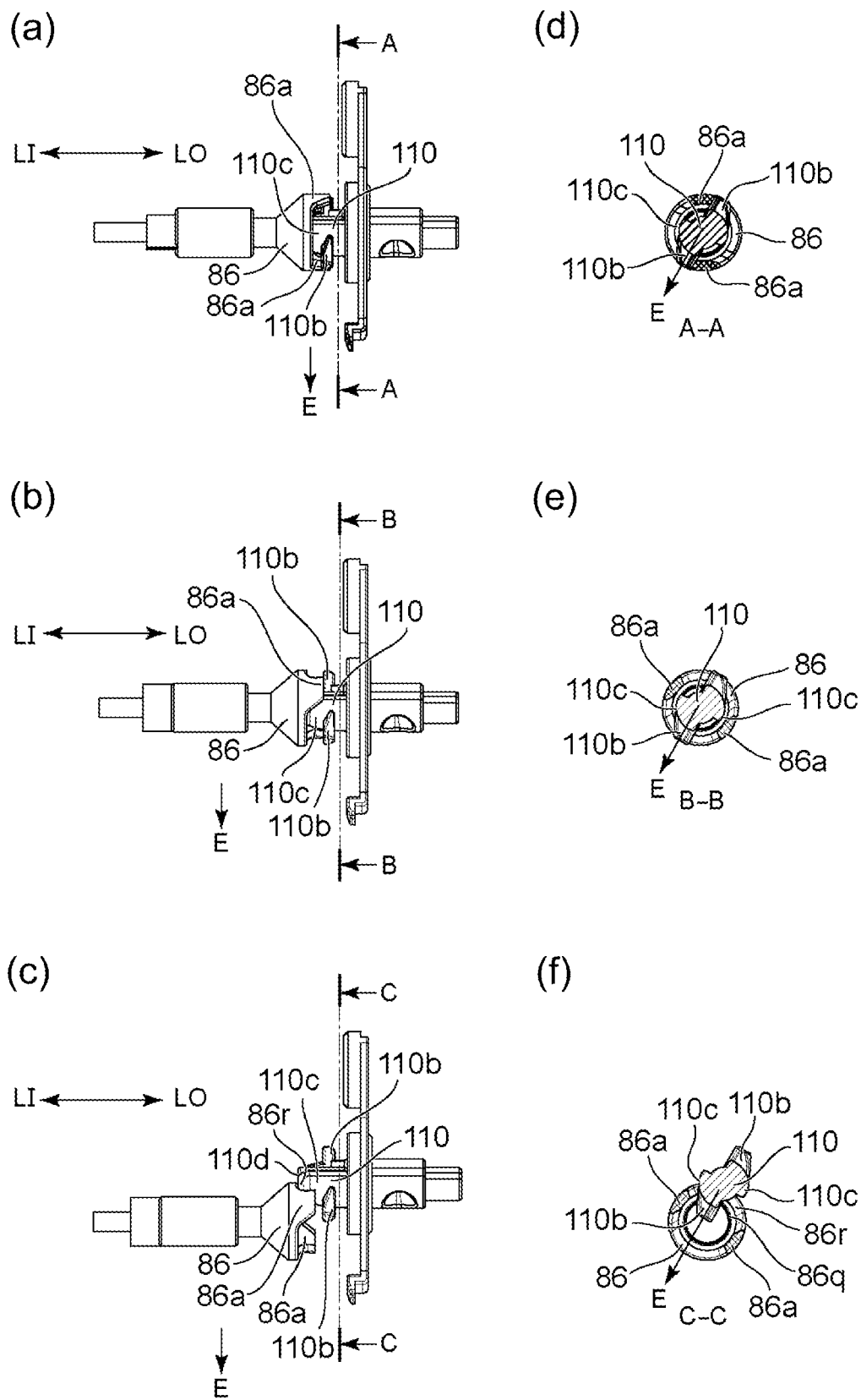
In FIG. 21, part (a)-Part (f) is an illustration for explaining how the cartridge is dismounted.

FIG. 21 is a view illustrating the positional relationship between the moving member 86 and the driving shaft 110 when the cartridge B is removed from the apparatus main assembly A.

From the state shown in part (a) of FIG. 21 to the state shown in part (c) of FIG. 21, the cartridge B is being dismounted. Part (d) of FIG. 21 to the part (f) of FIG. 21 are cross-sectional views, corresponding to the part (a) of FIG. 21 to the part (c) of Figure. Part (d) of FIG. 21 to part (f) of FIG. 21 are cross-sectional views, corresponding to the part (a) of FIG. 21 to the part (c) of FIG. 21. The direction of dismounting of the cartridge B is indicated by an arrow E.

Part (a) of FIG. 21 and part (d) of FIG. 21 are illustrations showing a state at the end of image forming operation. The driving shaft 110 and the moving member 86 stop at any arbitrary phase. At this time, since the opening/closing door 13 of the apparatus main assembly A is closed, the moving member 86 is a position projecting to the longitudinally outer side (outside of the cartridge) LO. The drive application portion 110b of the driving shaft 110 is in contact with the projection 86a of the moving member 86.

Part (b) of FIG. 21 and part (e) of FIG. 21 are illustrations showing a state in which the opening/closing door 13 of the apparatus main assembly A is opened. By opening the opening/closing door 13, as described above, the moving member 86 moves to the longitudinally inner side LI. By this, from a state in which the drive application portion 110b of the driving shaft 110 and the projection 86a of the moving member 86 are not in contact with each other, they become in a state of being slightly touched with each other.

With the moving member 86 moved to the longitudinally inner LI, the phase control mechanism of the moving member 86 described in FIG. 19 operates. Therefore, the projection 86a of the moving member 86 rotates to the phase shown in part (e) of FIG. 21, that is, the phase in which the movement is not prevented by the free end portion 110c of the driving shaft 110 when the projection 86a is moved in the separating direction E.

Part (c) of FIG. 21 and part (f) of FIG. 21 show a state in which the cartridge B is being dismounted from the apparatus main assembly A. The projection 86a of the moving member 86 moves in the separating direction E without being hindered by the free end portion 110c of the driving shaft 110. This movement is allowed even if the projection 86a abuts to the free end portion 110c, provided that the free end portion 110c is not prevented from moving in the dismounting direction E.

On the way of removing the cartridge B from the apparatus main assembly A, the free end portion 110c and the free end surface 110d (FIG. 20) of the driving shaft 110 abut to the inner surface 86q and the end surface 86r (part (a) in FIG. 17, FIG. 20) of the base 86b of the moving member 86. Along with this movement, the moving member 86 further moves to the longitudinally inner LI. Finally, the dismounting of the cartridge B from the apparatus main assembly A is completed.

As the above-mentioned coupling unit U and the structure relevant thereto are summarized as follows.

The driving force (rotational force) received by the moving member (moving coupling member) 86 from the outside of the cartridge is transmitted to the driving side flange 87 by way of the coupling shaft 90 (part (b) of FIG. 17). When the moving member 86 and the coupling shaft 90 transmit the driving force to the driving side flange 87, the moving member 86 and the coupling shaft 90 are engaged with each other and integrally rotate. The moving member (moving coupling member) 86 and the coupling shaft 90 are collectively referred to as a coupling member.

The coupling member (86, 90) is a member coupled (coupling) with the driving shaft 110 of the image forming apparatus main assembly, and also a member for receiving the driving force (rotational force) from the driving shaft 110 (part (a) in FIG. 21) outside the cartridge. The driving force received by the coupling member is transmitted to the drum cylinder 62 by way of the driving side flange 87. The drum cylinder 62 is rotatably supported by the frame of cartridge B, and therefore, when the driving force is transmitted, the drum cylinder 62 rotates with respect to the frame.

When the driving force is transmitted to the drum cylinder 62, the projection (driving force receiving portion) 86a provided on the moving member 86 first receives the driving force from the drive applying portion 110b of the driving shaft 110 (part (a) in FIG. 21). The driving force is transmitted from the engaging portion 86f (part (a) in FIG. 11) provided on the moving member 86 to the free end portion 90b (engaging portion 90b1) of the coupling shaft 90. And, the driving force is transmitted from the coupling shaft 90 to the driving side flange 87 by the way of the fixing screw 96 (FIG. 9) fixing the coupling shaft 90 to the driving side flange member 87. The driving side flange 87 is connected to the end of the drum cylinder 62, it transmits the driving force to the drum cylinder 62 (FIG. 3). The driving side flange 87 is connected to the end of the drum cylinder 62, and it transmits the driving force to the drum cylinder 62 (FIG. 3).

Here, the flange (driving side flange member 87) provided with the coupling members (86, 90) includes the gear portion 87b (part (a) in FIG. 9). The driving side flange member 87 is a gear member.

At least a portion of the coupling member is movable at least in the direction of the axis L2 of the coupling member. That is, in this embodiment, the moving member 86 of the coupling member moves along the axis L2 relative to the driving side flange 87 between the driving force transmitting position (projected position, advanced position) and the non-driving-force-transmitting position (retracted position) (parts (b) and (a) of FIG. 17). The driving force transmission position (part (b) in FIG. 17) is a position projecting toward the outside of the cartridge, away from the drum cylinder 62. On the other hand, the non-driving-force-transmitting position (retracted position) is the retracted position, toward the inside of the drum cylinder 62 (the inside of the cartridge). When the moving member 86 is in the driving force transmitting position (part (b) in FIG. 17), the free end of the moving member 86 is more away from the drum cylinder in the direction of the axis L2 than when in the driving force non-transmission position (part (a) of FIG. 17).

Here, in a narrow sense, the coupling member may mean only the moving member 86 provided with the driving force receiving portion (projection 86a).

On the other hand, the coupling shaft 90 is fixed to the driving side flange 87. The coupling shaft 90 can also be called a fixed member (fixed coupling member) in the coupling member. Here, it is also possible to take such a structure that when the coupling shaft 90 is fixed to the driving side flange 87, the coupling shaft 90 slightly moves relative to the driving side flange 87. For example, there may be a slight gap between the coupling shaft 90 and the drive flange 87 so that the coupling shaft 90 can move relative to the drive flange 87 within the range of the gap. Even in such a case, if the distance by which the coupling shaft 90 can move with respect to the driving side flange 87 is within a certain range, and if the driving force can be transmitted from the coupling shaft 90 to the driving side flange 87, there is no problem. In this embodiment, the coupling shaft 90 does not move in the direction of the axis L2 with respect to the driving side flange 87, and does not rotate about the axis L2, either.

In addition, the coupling shaft 90 may be referred to as a connecting member which is connected to the driving side flange member 87 such that the driving force from the coupling member can be transmitted to the driving side flange member 87. In addition, the coupling shaft 90 is a shaft provided on the driving side flange 87, and can also be called a support member for movably supporting the moving member 86.

The coupling shaft 90 is also a relay member (intermediate transmission member) for relaying the driving force received by the moving member 86 to the driving side flange 87, the coupling shaft 90 being provided between the moving member 86 and the driving side flange 87. In addition, the coupling shaft 90 is also a retaining member for preventing the moving member 86 from disengaging out of the driving side flange 87. The movable range of the moving member 86 is suppressed by the coupling shaft 90 in a predetermined range. That is, when the moving member 86 is located at the projecting position (advanced position), the movement of the moving member 86 is restricted by the free end portion 90b of the coupling shaft 90, and further movement of the moving member 86 in the axial direction LI is suppressed (Part (b) of FIG. 17). By this, it is suppressed for the moving member 86 in the projecting position to be separated from the drive flange member 87.

In addition, the coupling shaft 90 includes the shaft portion 90a extending along the moving direction of the moving member 86. The coupling shaft 90 is a guide member which guides the movement of the moving member 86 by the shaft portion (guide portion) 90a. The coupling shaft 90 is a shaft (shaft member, column member, shaft) the major portion of which (that is, the shaft portion 90a) has a shaft shape (column shape). The shaft portion 90a is a penetrating portion which passes (penetrates) at least the inside of the moving member 86.

A part on the free end side of the coupling shaft 90 (i.e. the free end portion 90b) is an exposed portion exposed to the outside of the moving member 86. The free end portion 90b has a maximum rotation radius larger than the maximum rotation radius of the shaft portion 90a. That is, the free end portion 90b is a portion (expanded portion, enlarged portion, expanded portion) radially expanded (expanded portion) from the shaft portion 90a, and the diameter of the free end portion 90b is larger than the diameter of the shaft portion 90b. That is, the free end portion 90b is a portion (expanded portion, enlarged portion, expanded portion) radially expanded (expanded portion) from the shaft portion 90a, and the diameter of the free end portion 90b is larger than the diameter of the shaft portion 90b. In addition, the diameter of the free end portion 90b is larger than the diameter of the through hole 86c (parts (a) and (b) of FIG. 11) of the moving member 86. In other words, the maximum rotation radius of the free end portion 90b is larger than the maximum rotation radius of the shaft 90b and the maximum rotation radius of the through hole.

In this embodiment, the free end portion 90b has a circular flat plate shape (disk shape), but it is not necessarily limited to such a shape. In addition, the maximum rotation radius of the free end portion 90b is larger than the maximum rotation radius of the small diameter portion 86y (part (b) of FIG. 12).

In addition, the free end portion 90b is provided with a driving force receiving portion (engaging portion 90b1) for receiving a driving force from the moving member 86 as shown in part (b) of FIG. 17 and FIG. 10. That is, the structure is such that the free end portion 90b (engaging portion 90b1) can receive driving force from the moving member 86 by engaging with the moving member 86. Here, the structure is such that one or both of the free end 86x and the small diameter portion 86y of the moving member 86 engage with the free end portion 90b (part (b) of FIG. 12). In this embodiment, the free end 86x is provided with the engaging portion 86f for engaging with the free end portion 90b (engaging portion 90b1).

The engaging portion 90b1 (FIG. 10, part (b) in FIG. 9) is positioned outside the shaft portion 90b and the through hole 86c in the radial direction of the coupling member. That is, the free end portion 90b engages with the moving member 86 at a position outside the shaft 90b in the radial direction of the coupling member.

The free end portion 90b receives the driving force from the moving member 86 while suppressing the moving member 86 from disengaging out of the driving side flange member. That is, the free end portion 90b can perform both the function of restricting the movement of the moving member 86 and the function of receiving the driving force, and therefore, the structure of the coupling member can be simplified.

The moving member 86 of the coupling member moves from the retracted position (part (a) in FIG. 17) to the advanced position (part (a) in FIG. 17) by mounting the cartridge B into the apparatus main assembly A (FIG. 1).

After the cartridge B is inserted into the mounting main assembly A, when the opening/closing door 13 (part (b) in FIG. 8) is closed, the mounting of the cartridge B to the apparatus main assembly A is completed. When the lever 102 (part (a) in FIG. 5, part (b) in FIG. 8) is pushed by the opening/closing door 13, the moving member 86 moves to the advanced position (part (a) in FIG. 17). On the contrary, when the opening/closing door 13 is opened (part (a) in FIG. 8), the moving member 86 moves to the retracted position (part (a) in FIG. 17). That is, the moving member 86 moves in accordance with the opening closing operation (parts (a) and (b) of FIG. 8) of the opening/closing door 13 provided in the apparatus main assembly A.

Next, the urging force of each spring usable with this embodiment will be described once again.

As shown in FIG. 17, in the coupling unit U3, the moving member 86 and the linear motion cam 93 are sandwiched between the driving side flange 87 and the coupling shaft 90. The urging force of the spring 95 as the urging member for urging the moving member 86 and the linear motion cam 93 toward the longitudinally outer side LO is depicted by F1. The urging force of the coupling spring 91 as the urging member for urging the moving member 86 and the linear motion cam 93 toward the longitudinally inner side LI is F2. At this time, f1>F2 (F1 is greater than F2).

In addition, a spring 106 as the urging member shown in part (b) of FIG. 5 functions to move the second lever 103 to the cleaning unit (60) side. By this, the rotating cam 92 overcomes the force which prevents the rotational movement of the rotating cam 92 caused by the urging forces F1 and F2, so that it rotates to the position of the non-engaged state shown in part (a) of FIG. 6 and part (a) of FIG. 17. In other words, the force for rotating the rotating cam 92 produced by the urging force of the spring 106 is set to be larger than the force which prevents the rotational movement of the rotating cam 92 which is produced by the urging force F1 by the urging member and the urging force F2 by the urging member.

In this state, by utilizing the urging force of the spring 106 (part (a) of FIG. 6), the rotating cam 92 compresses the urging member (spring 95) to retract the linear motion cam 93 toward the longitudinally inner side LO. With the retraction of the linear motion cam 93, the moving member 86 is also moved to the longitudinally inner side LO using the urging force of the spring 91. As a result, in the state where no external force is applied to the first lever 102 of the cartridge B, the moving member 86 retracts toward the longitudinally inner side LI it becomes a state. As a result, in the state where no external force is applied to the first lever 102 of the cartridge B, the moving member 86 retracts toward the longitudinally inner side LI. That is, the moving member 86 at this time is located at the driving force non-transmission position.

On the other hand, when a external force exceeding the elastic force of the spring 106 is applied to the first lever 102 of the cartridge B, the first lever 102 and the second lever 103 move while contracting the spring 106 (part (b) in FIG. 6). When the rotating cam 92 rotates in interrelation with the movement of the levers 102 and 103, as shown in part (b) of FIG. 17, the linear motion cam 93 is allowed to move in the longitudinal outer LO direction. At this time, the urging force F1 applied to the linear motion cam 93 overcomes the urging force F2 applied to the linear motion cam 93, and therefore, the force of the urging force F1 moves the linear motion cam 92 to the longitudinally outer side LO. The moving member 86 is also pushed forward by the linear motion cam 92 to advance toward the longitudinally outer side LO. That is, the moving portion seat 86 is urged by the spring 95 by way of the linear motion cam 92 to move to the drive transmission position (projected position, advanced position).

Here, as shown in parts (a) and (b) of FIG. 17, the coupling spring 91 continues to urge the moving member 86 in the direction (longitudinally inner side LI direction) in which the coupling spring 91 approaches to the linear motion cam 93. Therefore, the coupling spring 91 does not separate from the linear motion cam 93 even when the linear motion cam 93 moves to the longitudinally inner side LI. That is, the moving member 86 can be interlocked with the movement of the linear motion cam 93 by the urging force F2 of the coupling spring 91 which is an urging member. The coupling spring 91 is a holding member (a holding member, a elastic member, a urging member) for holding (maintaining) a state where the moving member 86 interlocks with the linear motion cam 93 by its elastic force (urging force).

The linear motion cam 93 is a support member which supports the moving member 86, and is also a interlocking member which moves with the moving member 86 by moving itself.

Here, the lever 102 is a operation member operated from the outside of the cartridge (in this embodiment, the opening/closing door 13: part (a) in FIG. 4) to move the coupling member (moving member 86). The first lever 102 is operatively (functionally) connected to the moving member 86. That is, the first lever 102 is connected to the moving member 86 through the connecting mechanism including the gear 104, the second lever 103, the cam mechanism (linear motion cam 93, rotation cam 93), each spring, and so on. And, the structure is such that the movement member 86 also moves (moves, operates) by the movement (movement, actuation) of the first lever 102. In the axial direction, the lever 102, the lever 103, the coupling member (moving member 86 or the coupling shaft 90) are disposed on the same side (i.e. the driving side) of the cartridge B.

With the above structure, it is possible to reliably engage and disengage the moving member 86 relative to the main assembly shaft 110.

As has been described in the foregoing, the present invention has made it possible to develop the prior art.

INDUSTRIAL APPLICABILITY

According to the present invention, there is provided a process cartridge and a drum unit capable of receiving a driving force from an apparatus main assembly, and a image forming apparatus including the process cartridge.

REFERENCE NUMERALS

U3 Coupling unit.
86 Coupling.
90 Coupling shaft.
91 Coupling spring.
92 Rotating cam.
93 Linear motion cam.
94 Torsion Spring.
95 Linear motion cam pressure spring.
100 Bearing.
101 Regulating member.
102 First lever.
103 Second lever.
104 Gear.
105 Cover.
106 Spring.

The invention claimed is:

1. A cartridge comprising:
a rotatable member rotatable about a rotational axis while carrying toner on a surface of the rotatable member;
a frame rotatably supporting the rotatable member; and
a gear member including a gear portion on an outer peripheral surface of the gear member, a rotational axis, and at least one engaging projection, the gear member being operatively connected to the rotatable member, and the gear member being positioned at a first end portion of the frame in a direction of the rotational axis of the rotatable member; and
a coupling member provided with (i) at least one protrusion that is capable of receiving a driving force and (ii) at least one engaging recess that is engageable with the at least one engaging projection of the gear member, the coupling member being positioned at the first end portion of the frame in the direction of the rotational axis of the rotatable member, the coupling member being movable relative to the gear member in the direction of the rotational axis of the gear member between (a) a first position and (b) a second position, with the coupling member being positioned closer to a second end portion of the frame that is opposite to the first end portion in the direction of the rotational axis of the rotatable member when the coupling member is in the second position than when the coupling member is in the first position, and at least a part of the coupling member being accommodated by the gear member,
wherein (i) the engaging projection of the gear member is not engageable with the engaging recess of the coupling member when the coupling member is in the second position, and (ii) the engaging projection of the gear member is engageable with the engaging recess of the coupling member and the gear member receives the driving force from the coupling member when the coupling member is in the first position.

2. A cartridge according to claim 1, wherein the gear member includes a plurality of the engaging projections positioned around the rotational axis of the gear member.

3. A cartridge according to claim 1, wherein the coupling member is a part of a coupling unit that includes a spring urging the coupling member toward the second position.

4. A cartridge according to claim 3, wherein the spring is provided between the coupling member and the gear member.

5. A cartridge according to claim 4, wherein at least a part of the spring is accommodated in the gear member.

6. A cartridge according to claim 1, wherein the coupling member includes (i) a free end portion provided with the driving force receiving portion and (ii) a small diameter portion having a maximum radius of rotation that is less than a maximum radius of rotation of the free end portion, at least a part of the small diameter portion being accommodated by the gear member.

7. A cartridge according to claim 6, wherein the free end portion has a portion having a maximum radius of rotation that gradually increases in a direction moving away from the gear member.

8. A cartridge according to claim 6, wherein the maximum radius of rotation of the small diameter portion is less than a distance between a rotational axis of the coupling member and the at least one protrusion.

9. A cartridge according to claim 1, further comprising an operating member that is operable to move the coupling member between the second position and the first position.

10. A cartridge according to claim 9, wherein the operating member is operable to move the coupling member toward the first position by receiving an external force.

11. A cartridge according to claim 9, wherein the operating member includes a lever.

12. A cartridge according to claim 5, wherein at least a part of the coupling member is surrounded by the spring.

13. A cartridge according to claim 1, wherein the rotatable member is a photosensitive drum.

14. A cartridge according to claim 1, wherein the coupling member includes a plurality of the engaging recesses positioned around the rotational axis of the gear member.

* * * * *